(12) United States Patent
Pellerin

(10) Patent No.: US 12,264,626 B2
(45) Date of Patent: Apr. 1, 2025

(54) MULTI-ADJUSTABLE VALVE FOR A LUBRICATION SYSTEM

(71) Applicant: Pratt & Whitney Canada Corp., Longueuil (CA)

(72) Inventor: Hugues Pellerin, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/228,459

(22) Filed: Jul. 31, 2023

(65) Prior Publication Data
US 2025/0043721 A1 Feb. 6, 2025

(51) Int. Cl.
| F16K 3/34 | (2006.01) |
| F02C 7/06 | (2006.01) |
| F16K 3/24 | (2006.01) |
| F16K 3/314 | (2006.01) |

(52) U.S. Cl.
CPC .................. *F02C 7/06* (2013.01); *F16K 3/24* (2013.01); *F16K 3/314* (2013.01); *F16K 3/34* (2013.01)

(58) Field of Classification Search
CPC ............... F16K 3/24; F16K 3/314; F16K 3/34
See application file for complete search history.

(56) References Cited

U.S. PATENT DOCUMENTS

| 4,245,465 A | 1/1981 | Milo |
| 4,620,560 A | 11/1986 | Coutant |
| 4,667,930 A * | 5/1987 | Latimer ................... F15B 13/04 251/324 |
| 5,427,144 A * | 6/1995 | Teets ......................... A61B 1/12 251/324 |
| 6,854,703 B2 | 2/2005 | Parker |
| 2014/0033730 A1 | 2/2014 | Vinski |

FOREIGN PATENT DOCUMENTS

| CN | 109945060 B | 9/2020 |
| JP | 2012017801 A | 1/2012 |
| JP | 2016098684 A | 5/2016 |

OTHER PUBLICATIONS

EP Search Report for EP Patent Application No. 24192090.9 dated Jan. 3, 2025.

* cited by examiner

*Primary Examiner* — P. Macade Nichols
(74) *Attorney, Agent, or Firm* — Getz Balich LLC

(57) ABSTRACT

A multi-adjustable valve for a flow of fluid within a lubrication system is provided, having a longitudinal axis. The valve includes a biasing member, a housing, first and second adjustable pistons, and a spool. The housing has an interior cavity and inlet and outlet fluid ports. The first adjustable piston is disposed in the housing interior cavity and is positionally adjustable within the housing interior cavity and is configured to produce a pressure adjusting effect on the flow of fluid. The biasing member is axially disposed between the second adjustable piston and the spool. The second adjustable piston is disposed within the housing interior cavity and is attached to the first adjustable piston and is positionally adjustable relative to the first adjustable piston, wherein the second adjustable piston, the biasing member, and the spool are configured to produce a pressure regulating effect on the flow of fluid.

20 Claims, 18 Drawing Sheets

Constant pressure differential and flow at cavity 1.
Cavity 2 pressure and flow will vary.

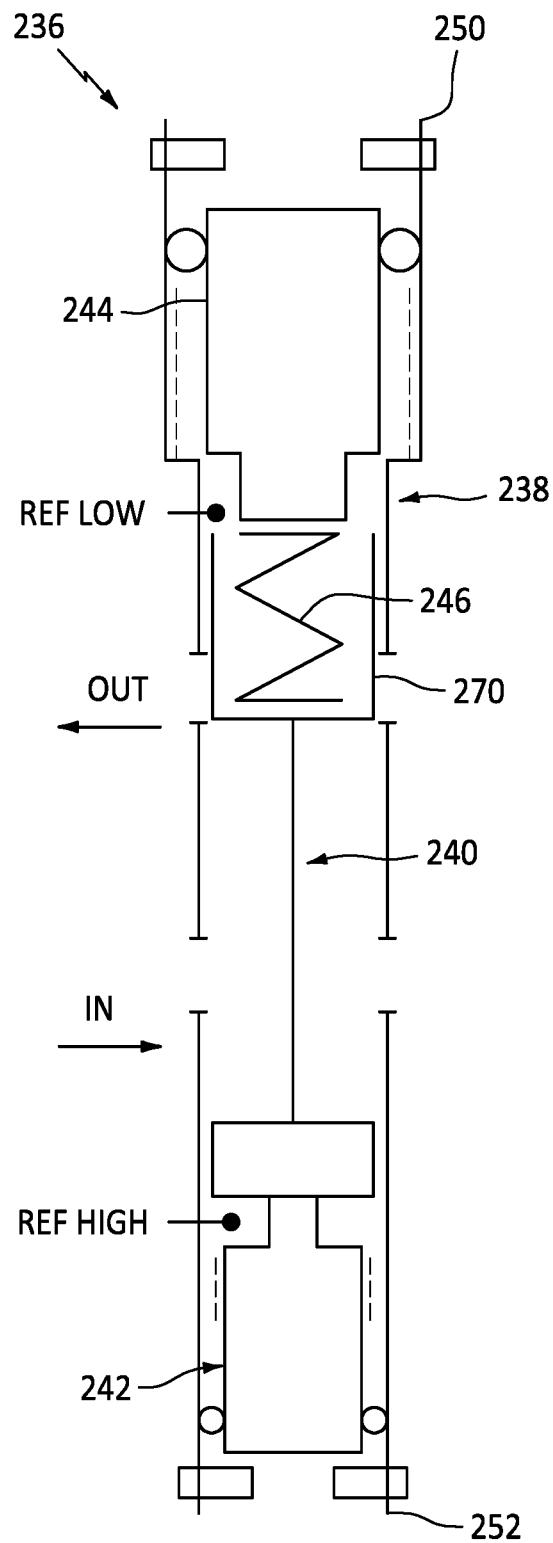
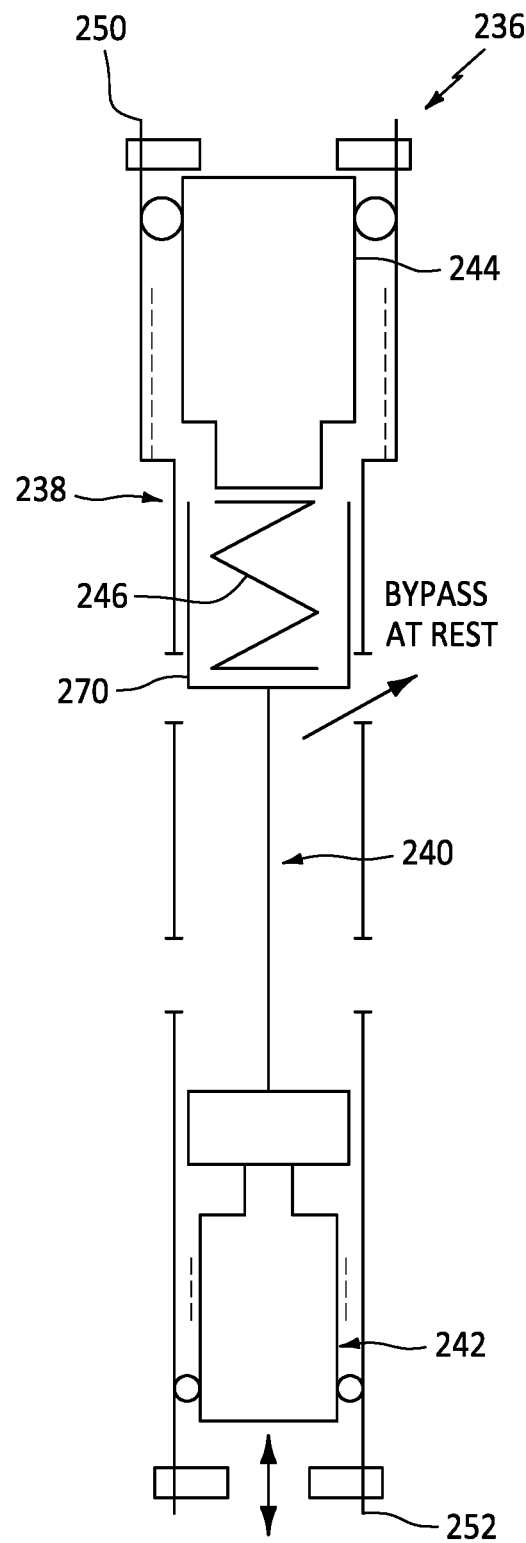
*FIG. 12*    *FIG. 12A*

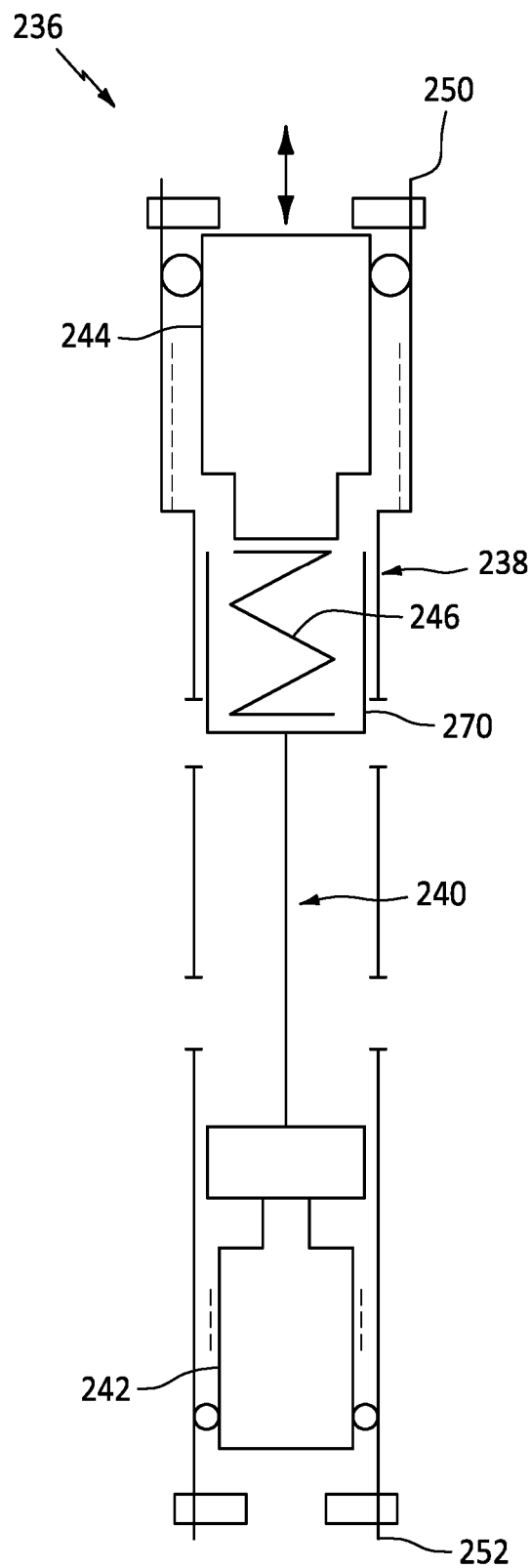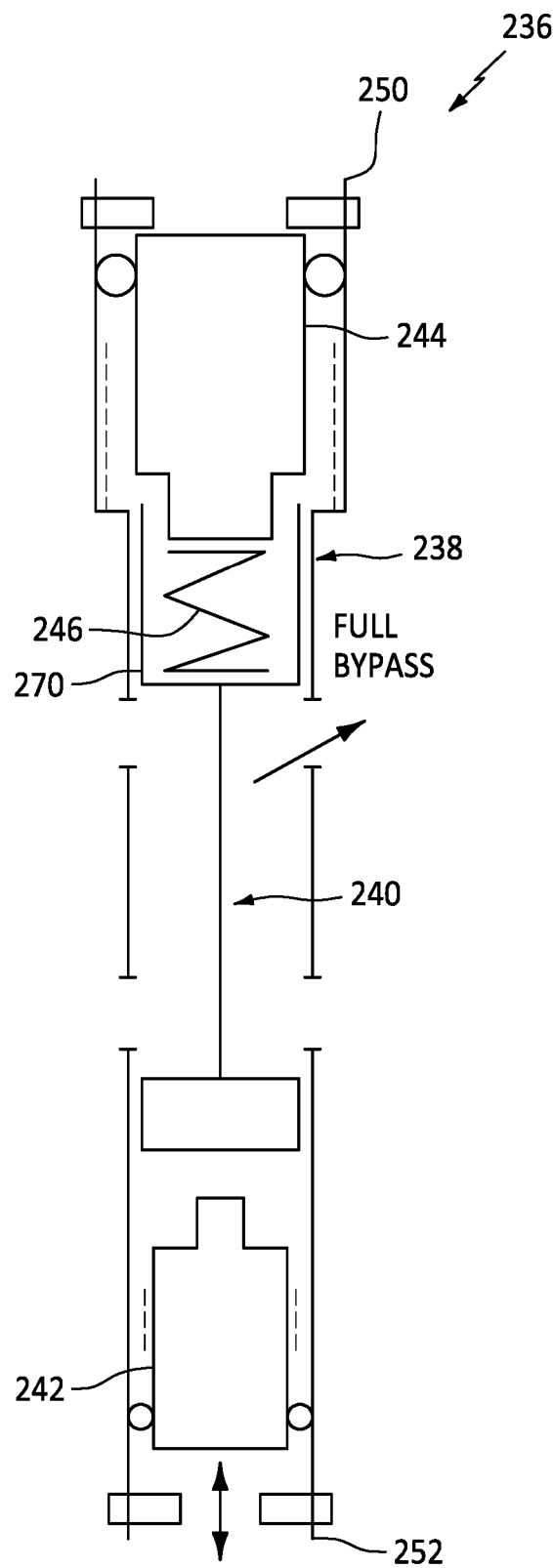
*FIG. 12B*  *FIG. 12C*

MULTI-ADJUSTABLE VALVE FOR A LUBRICATION SYSTEM

BACKGROUND OF THE INVENTION

1. Technical Field

The present disclosure relates gas turbine engine fluid lubrication systems in general and to valves for controlling a flow of a fluid lubricant in particular.

2. Background Information

Aircraft engine oil systems are designed to lubricate and cool components that engage and disengage, such as gears, bearings, and journal bearings or static elements such as internal cavity walls to avoid overheating. To accomplish these functions, oil is typically circulated through an oil tank, a pressure oil pump, one or more cavities containing the components requiring oil, and then back to the oil tank. The oil flow pressure within the system can be controlled in different ways. For example, it is known to use an oil pressure adjusting valve (PAV) to control system oil pressure. In a PAV controlled system, the oil inlet pressure to a component cavity is typically proportional to the oil pump speed. The volumetric flow to each component cavity will, therefore, be proportional to the pressure differential for each respective component cavity relative to the oil pump outlet pressure, neglecting oil passage pressure losses. FIG. 1 diagrammatically illustrates an example of such a system, where "idle" refers to operation of the engine at ground idle and "TO" refers to operation of the engine at take-off. FIG. 1A is a graph of pump outlet oil pressure versus pump speed having a first data line representative of engine oil system requirements and a second data line representative of the oil pump nominal capacity. The difference between the data lines reflects the effect of a PAV to adjust to meet the engine oil system requirements.

It is also known to use an oil pressure regulating valve (PRV) to control system oil pressure. Depending on where the reference pressure is located, a PRV controlled system may be configured to provide constant oil pump outlet pressure for all of the engine component cavities (e.g., see FIGS. 2 and 2A), or a constant flow to respective regulated cavities (e.g., see FIGS. 3 and 3A).

In contrast to PAVs, PRVs are always on the hunt to maintain a constant differential pressure between low and high pressure references and to dampen any pressure spike that may occur due to sudden accessory transient oil demand, fluctuating temperatures, altitude and the like.

What is needed is an improved oil lubrication system and valving that makes the improvement possible, for example including a valve that provides PAV-like behavior below a given pressure threshold and PRV-like behavior above the pressure threshold.

SUMMARY

According to an aspect of the present disclosure, a multi-adjustable valve for metering a flow of fluid within a lubrication system is provided. The valve has a longitudinal axis and includes a biasing member, a housing, a first adjustable piston, a second adjustable piston, and a spool. The housing has an interior cavity, a fluid inlet port, and a fluid outlet port. The interior cavity extends between first and second ends of the housing. The first adjustable piston is configured for threaded engagement with the housing interior cavity adjacent to the first end of the housing. The first adjustable piston is axially moveable within the housing interior cavity via the threaded engagement with the housing interior cavity. The second adjustable piston has a shaft and a head disposed at a distal end of the shaft. The shaft is configured for threaded engagement with the first adjustable piston. The second adjustable piston is axially moveable via the threaded engagement between the shaft and the first adjustable piston. The spool has a spool shaft connected to and extending between a spring housing (SH) and an end cap. The end cap is disposed adjacent to the second end of the housing. The spring housing has an SH interior cavity configured to receive the biasing member. The spool is configured for axial movement within the housing interior cavity. The second adjustable piston head is disposed in the spring housing and the biasing member is disposed between the second adjustable piston head and a base surface of the spring housing. In a compressed state, the biasing member produces a biasing force that biases the spool toward the second end of the housing. The multi-adjustable valve is configured to receive fluid at a first pressure between the spring housing and the first end of the housing, and to receive fluid at a second pressure between the spool end cap and the second end of the housing, and during use the multi-adjustable valve meters flow of the fluid by the spool spring housing entirely blocking the housing fluid outlet port, or partially blocking the housing fluid outlet port, or not blocking the housing fluid outlet port as a function of a difference between the first pressure and the second pressure and the biasing force.

In any of the aspects or embodiments described above and herein, the housing may include first and second housing segments. The first housing segment extends between the first end of the housing and the second housing segment and the second housing segment extends between the second end of the housing and the second housing segment. The housing interior cavity may include a first interior cavity (FIC) disposed in the first housing segment and a second interior cavity (SIC) disposed in the second housing segment. The first interior cavity may have an FIC inner diameter and the second interior cavity has an SIC inner diameter, and the FIC inner diameter may be greater than the SIC inner diameter.

In any of the aspects or embodiments described above and herein, the fluid inlet and outlet ports may be disposed in the second housing segment, and the fluid outlet port may be axially disposed between the fluid inlet port and the first housing segment.

In any of the aspects or embodiments described above and herein, the first interior cavity disposed in the first housing segment may have a FIC inner diameter surface that defines the FIC inner diameter, and the FIC inner diameter surface may be configured for the threaded engagement with the first adjustable piston.

In any of the aspects or embodiments described above and herein, the first adjustable piston (FAP) may include an FAP interior cavity and the second adjustable piston shaft may be in threaded engagement with the FAP interior cavity.

In any of the aspects or embodiments described above and herein, the first adjustable piston may extend axially between FAP first and second axial ends, and may include a distal end flange disposed at the FAP second axial end. The distal end flange may be disposed within the SH interior cavity. The threaded engagement between the second adjustable piston shaft and the FAP interior cavity permits selective axial positioning of the second adjustable piston head relative to the distal end flange within the SH interior cavity.

In any of the aspects or embodiments described above and herein, the SH interior cavity may include first and second SH interior cavities. The first SH interior cavity may have a first SH interior cavity inner diameter and the second SH interior cavity may have a second SH interior cavity inner diameter. The second SH interior cavity inner diameter may be equal to or greater than the first SH interior cavity diameter. The distal end flange (DEF) may have a DEF outer radial diameter, and the DEF outer radial diameter may be less than the second SH interior cavity inner diameter. The DEF outer radial diameter may be equal or greater than the first SH interior cavity diameter.

In any of the aspects or embodiments described above and herein, the second adjustable piston (SAP) head may have has an SAP head outer radial surface disposed at an SAP head outer radial diameter, and the SAP head outer radial diameter may be greater than the first SH interior cavity diameter.

In any of the aspects or embodiments described above and herein, the distal end flange may include one or more vent apertures.

In any of the aspects or embodiments described above and herein, the spool end cap (EC) may be T-shaped with a first EC portion having a first EC portion outer radial surface disposed at a first EC portion outer radial diameter, and a second EC portion extending axially outward from the first EC portion. The second EC portion having a second EC portion outer radial surface may be disposed at a second EC portion outer radial diameter. The first EC portion outer radial diameter may be greater than the second EC portion outer radial diameter.

According to an aspect of the present disclosure, a lubrication system for providing a fluid to one or more component cavities associated with an aircraft propulsion system is provided. The system includes a tank, a pressure pump, and a multi-adjustable valve. The tank is configured to hold a volume of the fluid. The pressure pump is configured to pump the fluid to the one or more component cavities. The multi-adjustable valve is configured to control a pressure differential of a flow of the fluid across at least one of the component cavities. The multi-adjustable valve has a longitudinal axis and includes a biasing member, a housing, a first adjustable piston, a second adjustable piston, and a spool. The housing has an interior cavity, fluid inlet and outlet ports. The interior cavity extends between first and second ends of the housing. The first adjustable piston is configured for threaded engagement with the housing interior cavity adjacent the first end of the housing. The first adjustable piston is axially moveable within the housing interior cavity via the threaded engagement with the housing interior cavity. The second adjustable piston has a shaft and a head disposed at a distal end of the shaft. The shaft is configured for threaded engagement with the first adjustable piston. The second adjustable piston is axially moveable via the threaded engagement between the shaft and the first adjustable piston. The spool has a spool shaft connected to and extending between a spring housing (SH) and an end cap. The end cap is disposed adjacent to the second end of the housing. The spring housing has an SH interior cavity configured to receive the biasing member. The spool is configured for axial movement within the housing interior cavity. The second adjustable piston head is disposed in the spring housing and the biasing member is disposed between the second adjustable piston head and a base surface of the spring housing. In a compressed state, the biasing member produces a biasing force that biases the spool toward the second end of the housing. The valve is configured to receive the fluid at a first pressure between the spring housing and the first end of the housing, and to receive the fluid at a second pressure between the spool end cap and the second end of the housing. During use, the multi-adjustable valve is configured to meter the flow of the fluid through the housing fluid inlet port and the housing fluid outlet port by the spool spring housing entirely blocking the housing fluid outlet port, or partially blocking the housing fluid outlet port, or not blocking the housing fluid outlet port as a function of a difference between the first pressure and the second pressure and the biasing force.

According to an aspect of the present disclosure, a multi-adjustable valve for a flow of fluid within a lubrication system is provided. The valve has a longitudinal axis and includes a biasing member, a housing, a first adjustable piston, a second adjustable piston, and a spool. The housing has an interior cavity, an inlet fluid port, and an outlet fluid port. The first adjustable piston is disposed in the housing interior cavity and is positionally adjustable within the housing interior cavity and is configured to produce a pressure adjusting effect on the flow of fluid. The biasing member is axially disposed between the second adjustable piston and the spool. The second adjustable piston is disposed within the housing interior cavity and is attached to the first adjustable piston and is positionally adjustable relative to the first adjustable piston, wherein the second adjustable piston, the biasing member, and the spool are configured to produce a pressure regulating effect on the flow of fluid.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

FIGS. 12-12C are diagrammatic views of a present disclosure multi-adjustable valve embodiment, illustrating components of the multi-adjustable valve positionally varied.

DETAILED DESCRIPTION

Figure 1:
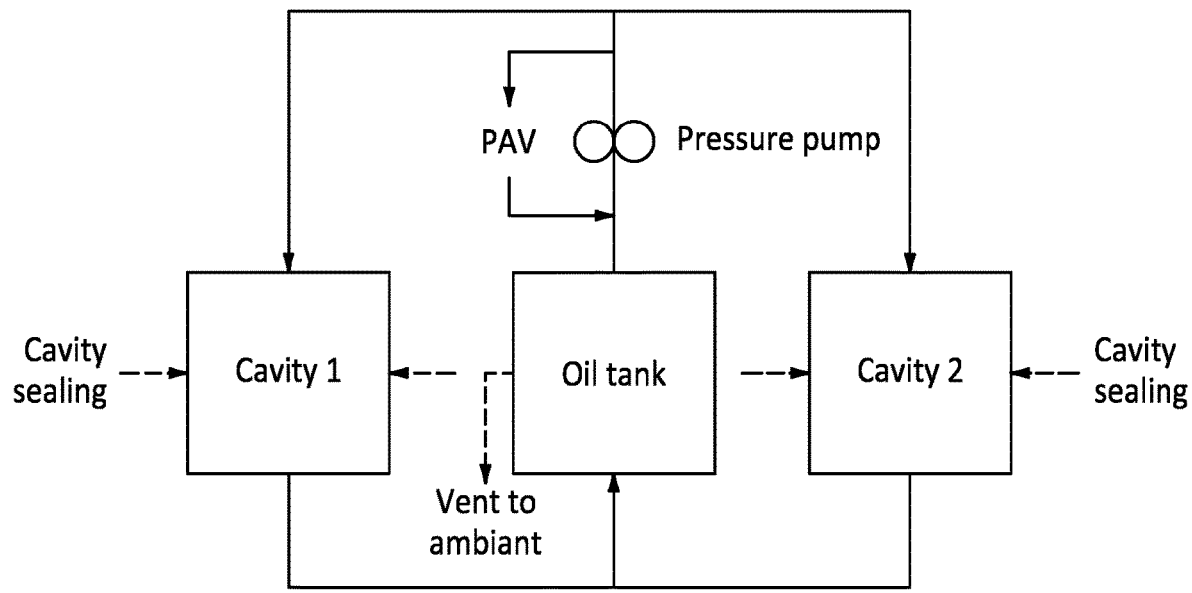
FIG. 1 is a diagrammatic illustration of a lubrication system embodiment utilizing a pressure adjusting valve (PAV).
Figure 1A:
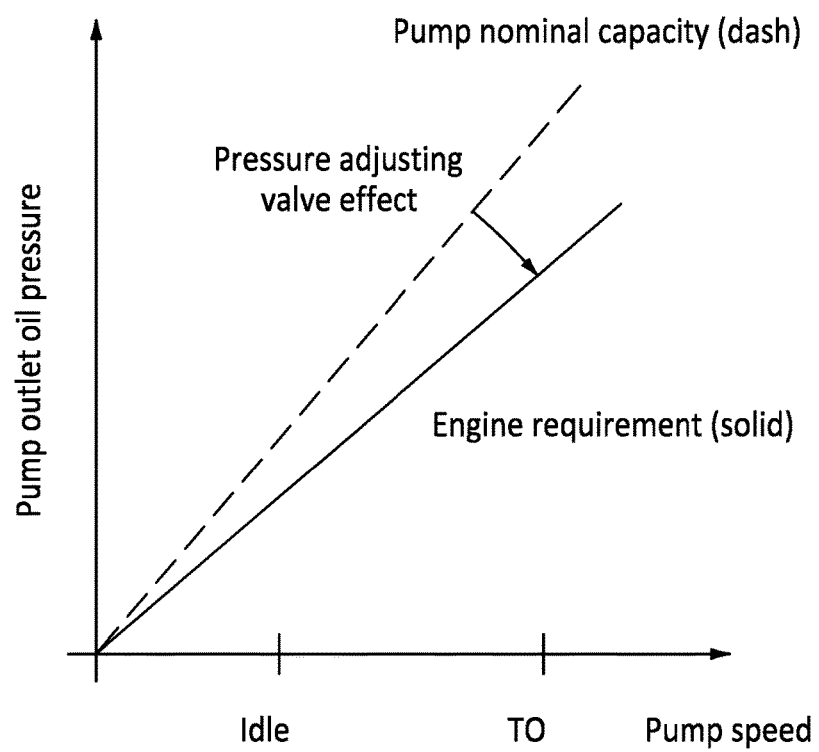
FIG. 1A is a graph of pump outlet oil pressure versus pump speed for a lubrication system utilizing a PAV like that shown in FIG. 1.
Figure 2:
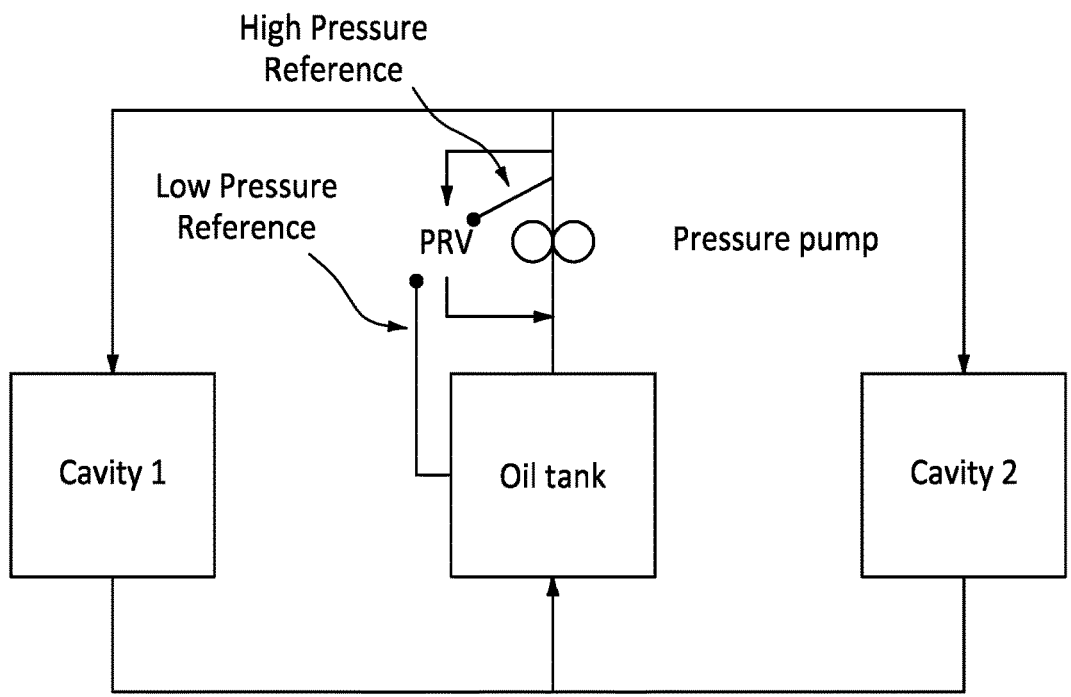
FIG. 2 is a diagrammatic illustration of a lubrication system embodiment utilizing a pressure regulating valve (PRV).
Figure 2A:
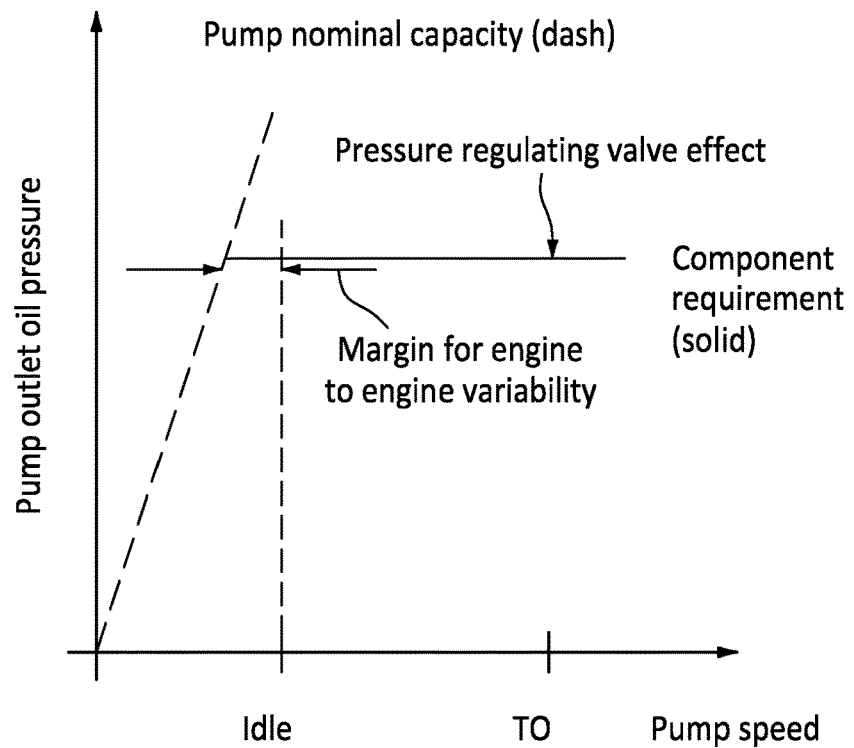
FIG. 2A is a graph of pump outlet oil pressure versus pump speed for a lubrication system utilizing a PRV like that shown in FIG. 2.
Figure 3:
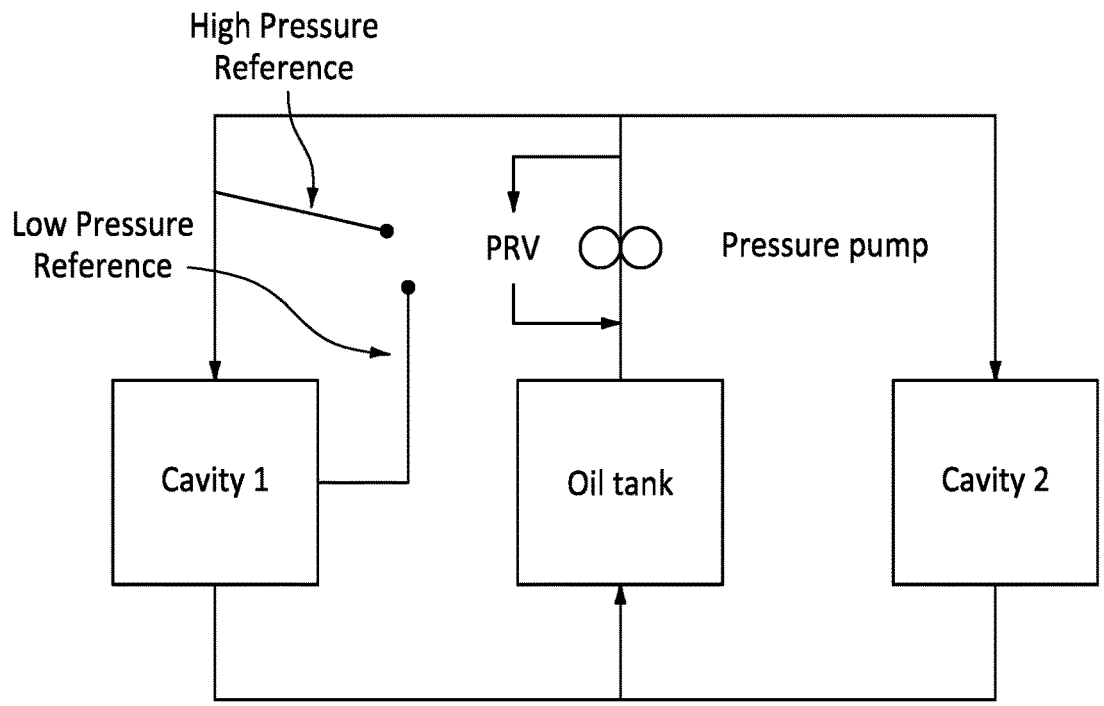
FIG. 3 is a diagrammatic illustration of a lubrication system embodiment utilizing a pressure regulating valve (PRV).
Figure 3A:
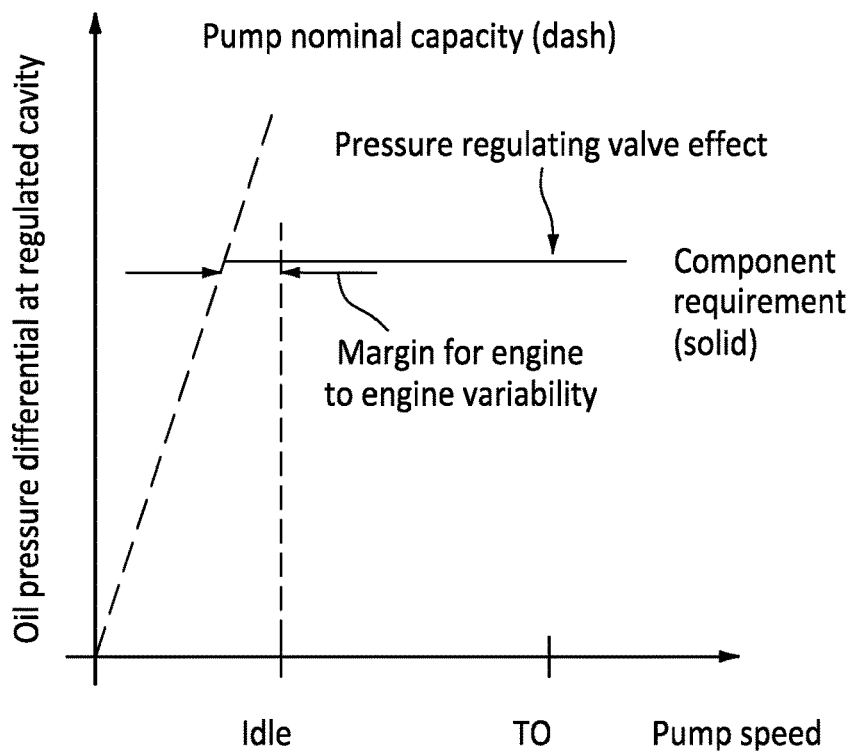
FIG. 3A is a graph of pump outlet oil pressure versus pump speed for a lubrication system utilizing a PRV like that shown in FIG. 3.
Figure 4:
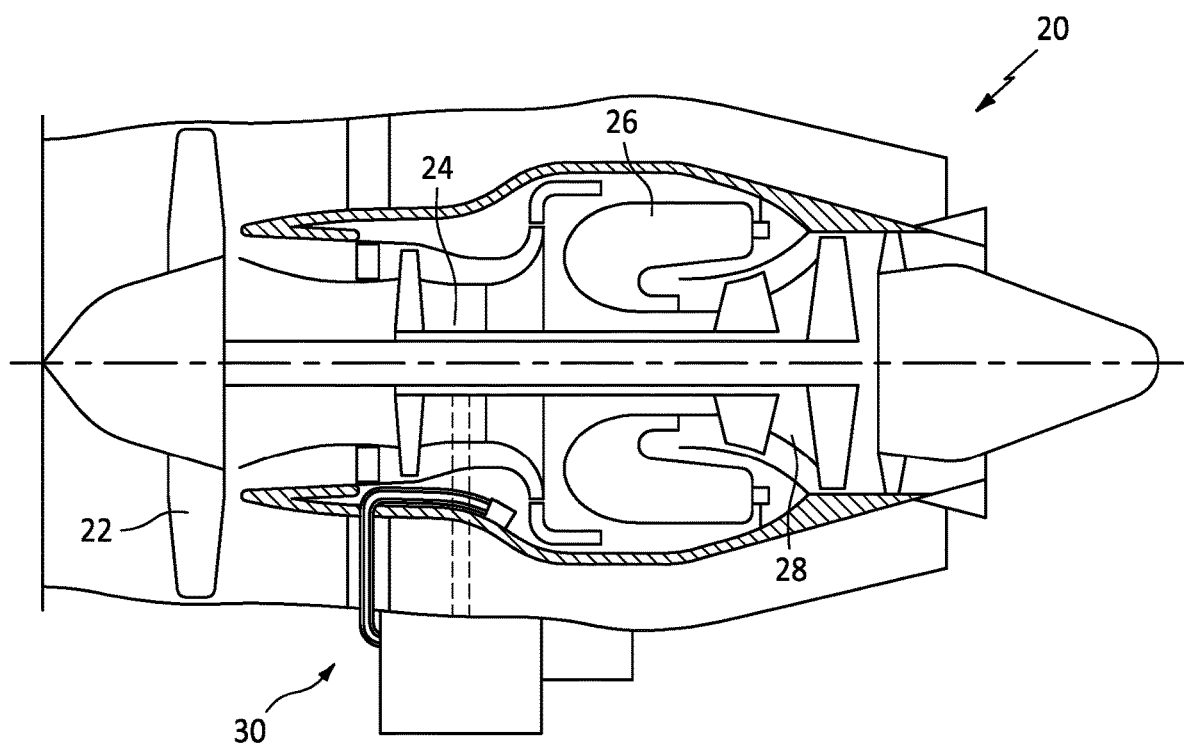
FIG. 4 is a diagrammatic view of a gas turbine engine having a lubrication system.

FIG. 4 illustrates an aircraft propulsion system having a gas turbine engine 20 that includes a fan section 22, a compressor section 24, a combustor 26, and a turbine section 28. The present disclosure may be used within conventional through-flow or reverse flow gas turbine engines, gas turbine engine types such as turbofan engines, turboprop engines, turboshaft engines, and internal combustion engines as well. The engine 20 further comprises one or more fluid systems, such as a lubrication system 30 that circulates a fluid lubricant (e.g., which may be referred to hereinafter as "oil") to both lubricate and cool components; e.g., bearings, gears (e.g., within a gearbox), and other components. The present disclosure is not limited to use with any particular type of lubricant/oil.

Figure 5:
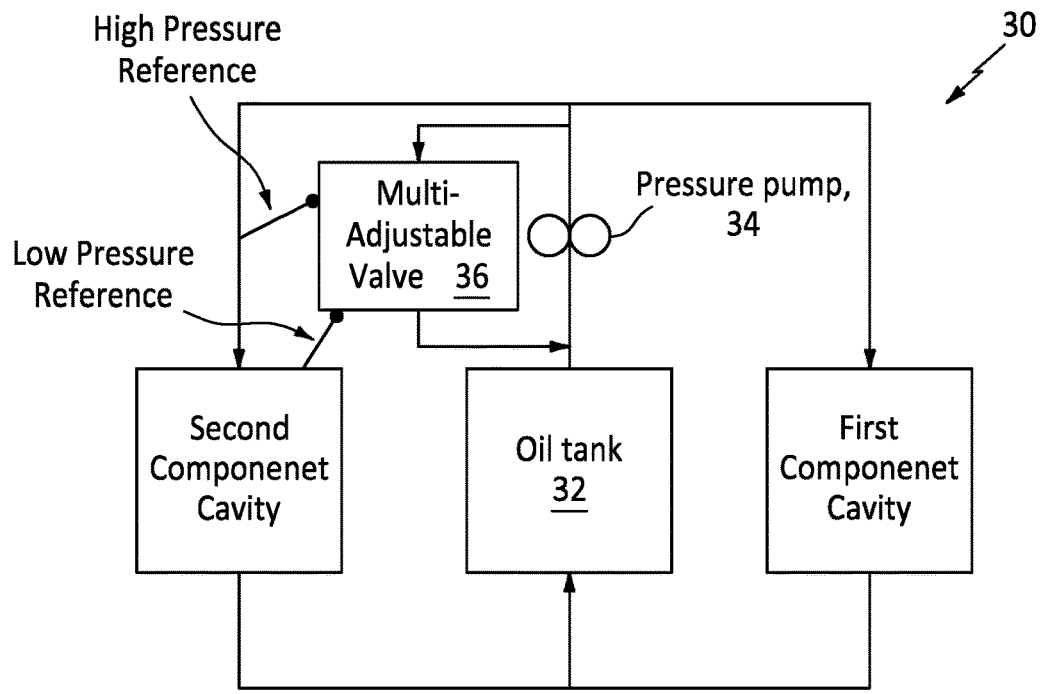
FIG. 5 is a diagrammatic illustration of a lubrication system embodiment utilizing a present disclosure multi-adjustable valve.
Figure 5A:
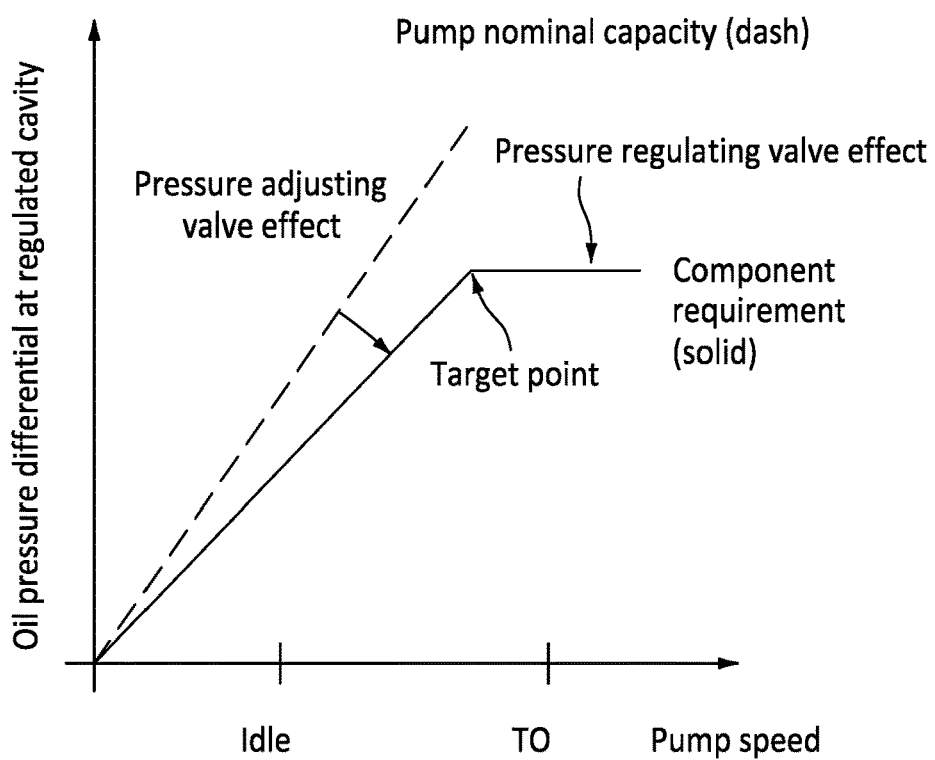
FIG. 5A is a graph of oil pressure differential at a regulated component cavity versus pump speed for a lubrication system utilizing a present disclosure multi-adjustable valve like that shown in FIG. 5.

FIG. 5 diagrammatically illustrates a non-limiting embodiment of a present disclosure aircraft engine lubrication system 30. FIG. 5A is a graph of oil pressure differential at a regulated component cavity versus pressure pump speed for the system diagrammatically shown in FIG. 5. The system embodiment includes an oil tank 32, a pressure pump 34, and a multi-adjustable valve 36 for providing lubrication to a plurality of component cavities; e.g., "first component cavity" and "second component cavity". The term "component cavity", unless otherwise indicated, is used to refer to a component that may be associated with the aircraft propulsion system that utilizes oil as a lubricant and/or as a coolant. Such a component may be an engine component, or a component that is peripheral to the engine, or the like. Non-limiting examples of component cavities include gearboxes, bearings (including journal bearings), engine mounted aircraft accessories, or engine/engine peripheral structures that utilize oil as a lubricant and/or as a coolant. The present disclosure lubricant system is not limited to including an oil tank 32, a pressure pump 34, and a multi-adjustable valve 36 and may include, for example, a scavenge pump, a deaerator, flow control devices such as valves, filters, separators, heat exchangers, sensors, and the like. The present disclosure lubricant system is also not limited to servicing only a first and second component cavity, and may be used to service more than two component cavities.

The oil tank 32 is a reservoir configured to hold a volume of oil or other fluid lubricant. The oil tank has at least one fluid inlet, at least one fluid outlet, and typically includes a gas (e.g., air) vent. The size and configuration of the oil tank 32 may vary depending on the system.

The pressure pump 34 may be a positive displacement pump such as a geared pump. The pressure pump 34 may be in mechanical communication with the engine; e.g., via a gearbox. The present disclosure is not limited to any particular type of pressure pump 34; e.g., an electrically driven pump may be used.

Components within the present disclosure system may be connected to one another by a respective fluid line; e.g., a pipe, a tube, or the like configured to contain and permit passage of a fluid therethrough. The term "in fluid communication" is used herein to mean that a fluid line extends between the named components and is configured to contain a fluid flow between the components.

As stated above, FIG. 5 diagrammatically illustrates a present disclosure aircraft engine lubrication system embodiment. In this example, oil may be drawn from the oil tank 32 by the pressure pump 34 and supplied by the pressure pump 34 to the first component cavity and the second component cavity. The oil is returned from the first component cavity and the second component cavity to the oil tank 32. Also as stated above, system embodiments may include other components such as scavenge pumps, deaerators, and the like.

Figure 6:
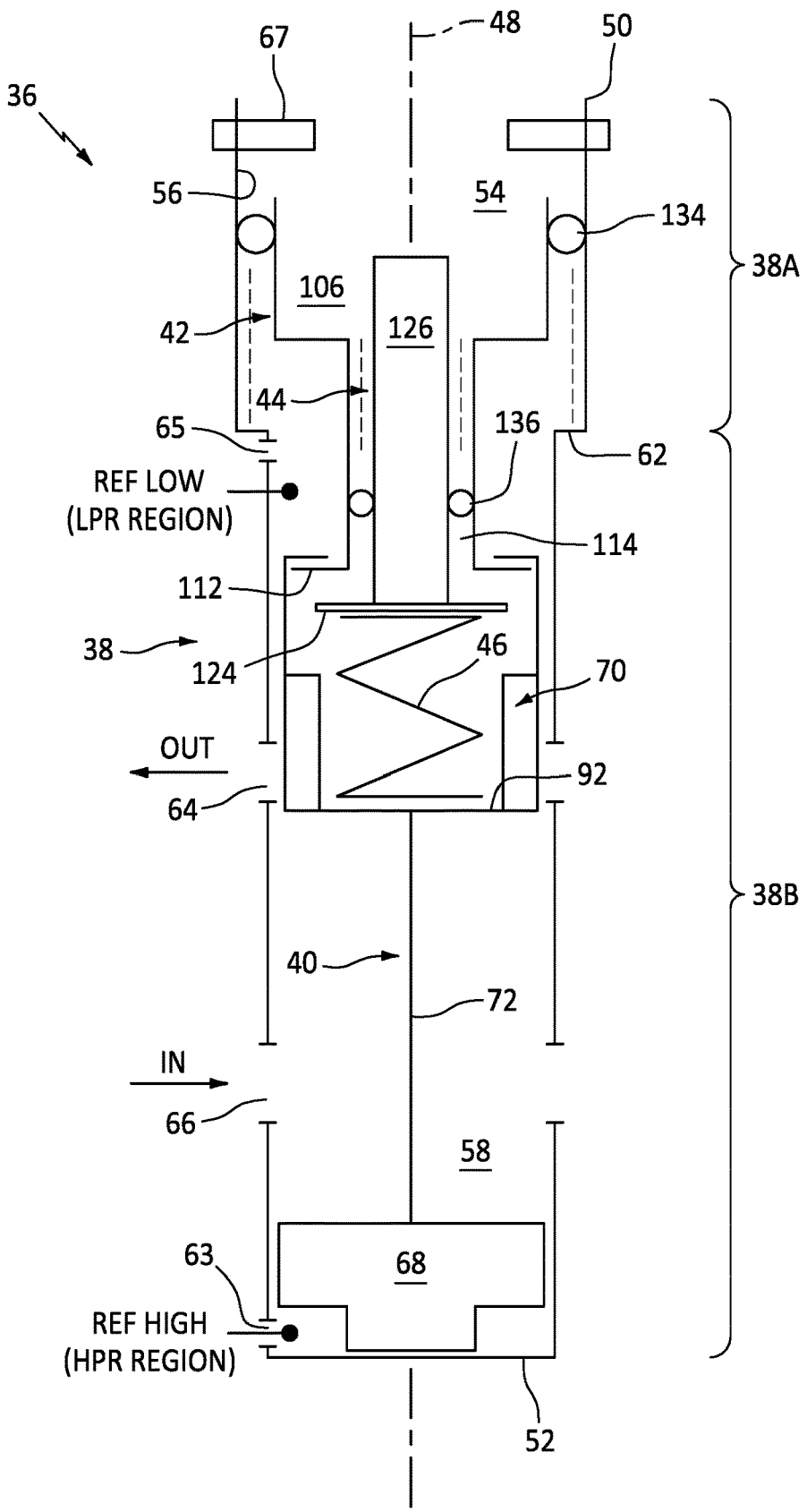
FIG. 6 is a diagrammatic view of a present disclosure multi-adjustable valve embodiment.

Referring to FIG. 6, an embodiment of a present disclosure multi-adjustable valve 36 configured to control oil flow across the pressure pump 34, and consequently oil flow within the lubricating system is diagrammatically shown. The multi-adjustable valve 36 is configured to produce a pressure adjusting valve effect and a pressure regulating valve effect. The multi-adjustable valve 36 includes a housing 38, a spool 40, a first adjustment piston 42, a second adjustment piston 44, and a biasing member 46. The multi-adjustable valve 36 has a lengthwise (i.e., axial) extending axis 48. The biasing member 46 may be any structure that can produce a biasing force upon being compressed. Non-limiting examples of a biasing member 46 are a coil spring, a pair of Belleville washers stacked in opposing orientation, and the like.

Figure 7:
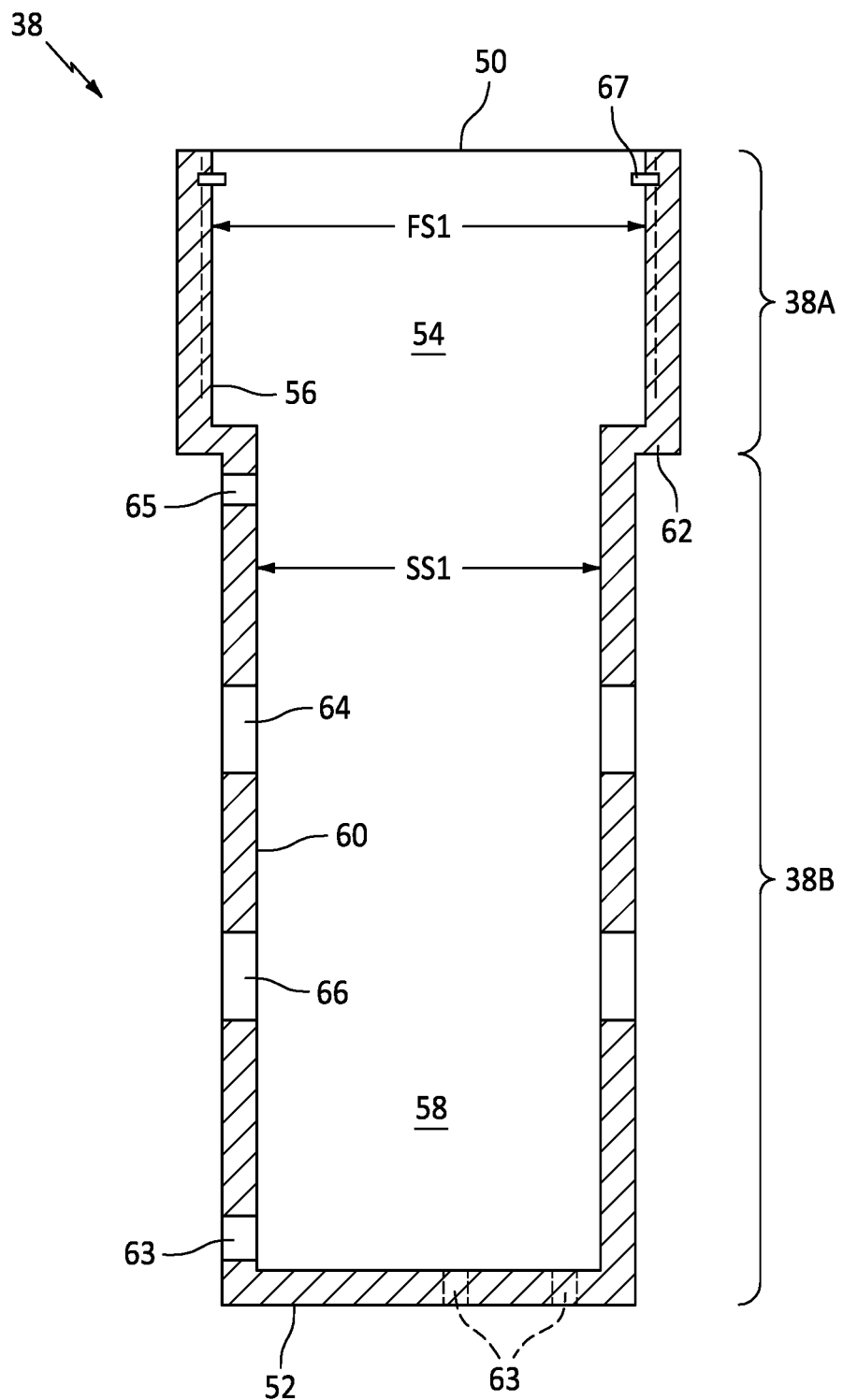
FIG. 7 is a diagrammatic view of a housing component embodiment that may be used in a present disclosure multi-adjustable valve.

Referring to FIG. 7, the housing 38 has a first housing segment 50 and a second housing segment 38B and extends lengthwise along the lengthwise axis 48 between a first end 50 and a second end 52. In the embodiment shown in FIG. 7, the second end 52 of the housing 38 is closed. The first housing segment 38A extends from the first end 50 to the second housing segment 38B, and the second housing segment 38B extends from the second end 52 to the first housing segment 38A. The first housing segment 38A (FS) has an FS interior cavity 54 that is defined by an FS inner diameter surface 56 disposed at a first inner diameter (FS1). The second housing segment (SS) has a SS interior cavity 58 defined by a SS inner diameter surface 60 disposed at a second inner diameter (SS1). In the embodiment shown in FIG. 7, the first inner diameter is greater than the second inner diameter (FS1>SS1). A shoulder 62 extends radially between the first and second housing segments 38A, 38B. At least a portion of the FS inner diameter surface 56 of the FS interior cavity 54 is configured for threaded engagement with the first adjustment piston 42 as will be detailed herein. The second housing segment 38B includes at least one fluid outlet port 64 and at least one fluid inlet port 66. A retainer ring 67 (e.g., a snap ring, a spiral retaining ring, or the like) may be disposed adjacent to the first end 50 of the housing 38.

The housing includes a high reference point inlet 63 and a low reference point inlet 65. In the embodiments shown in FIGS. 6 and 7, the high reference point inlet 63 is disposed to provide a fluid inlet on the second end 52 side of the spool end cap 68. FIG. 7A illustrates in dashed lines alternative positions for the high reference point inlet 63 to accommodate different spool end cap 68 configurations; e.g., see FIGS. 8 and 8A. As will be detailed herein, the low reference point imposes its pressure in the interior cavity 54 of the first housing segment and in the first internal cavity portion 88 of the spring housing 70, while the high pressure reference imposes its pressure in the region below the spool cap 68 of the spool 40.

Figure 8:
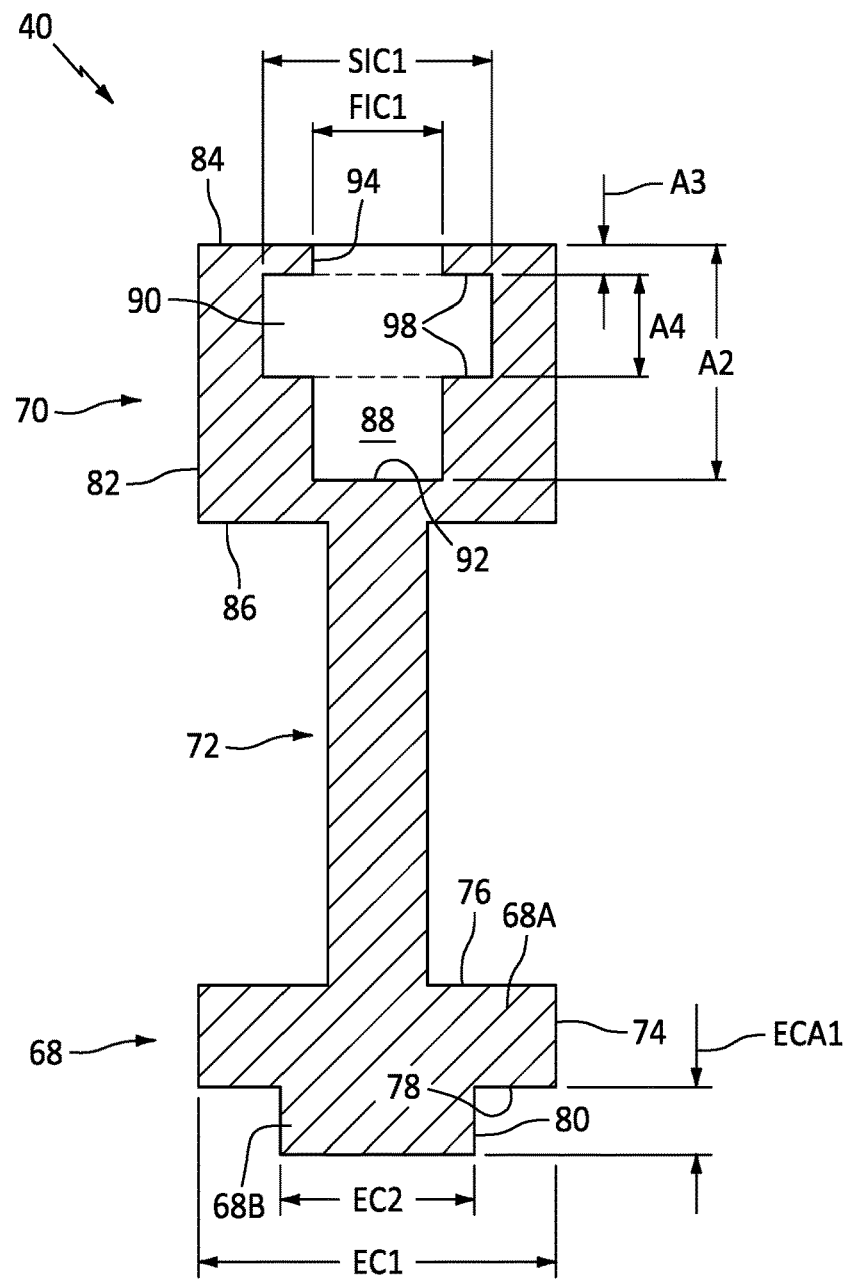
FIG. 8 is a diagrammatic view of a spool component embodiment that may be used in a present disclosure multi-adjustable valve.
Figure 8A:
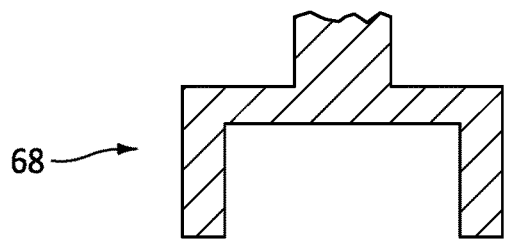
FIG. 8A is a partial view of a spool embodiment, illustrating an alternative end cap embodiment.

Referring to FIG. 8, the spool 40 includes an end cap 68 and a spring housing 70 connected to one another by a spool shaft 72. The spool 40 extends along the lengthwise axis 48. The spring housing 70 is disposed at one lengthwise end of the spool 40 and the end cap 68 is disposed at the opposite lengthwise end of the spool 40. In the embodiment shown in FIG. 8, the end cap 68 (EC) has a "T" configuration with a first EC portion 68A and a second EC portion. The first EC portion has an outer radial surface 74 that extends between a first axial surface 76 and a second axial surface 78 lengthwise spaced apart from one another. The first EC portion outer radial surface 74 is disposed at an outer radial diameter (EC1). The second EC portion 68B extends an axial distance "ECA1" out from the second axial surface 78 of the first EC portion 68A. The second EC portion 68B has an outer radial surface 80 disposed at an outer radial diameter (EC2) that is less than the first outer radial diameter (EC1>EC2). The outer radial diameter EC1 of the first EC portion 68A is less than the SS interior cavity inner diameter SS1 to permit the end cap 68 to axially travel within the second housing segment 38B. A fluid seal may be disposed between the end cap outer radial surface 74 (at EC1) and the SS interior cavity inner diameter surface 60.

The present disclosure is not limited to an end cap 68 having a "T"-shaped configuration. A non-limiting example of an alternative end cap 68 configuration is the "U"-shaped end cap shown in FIG. 8A.

Still referring to FIG. 8, the spool spring housing 70 has an outer radial surface 82 that extends lengthwise between a first axial end surface 84 and a second axial end surface 86. The spring housing 70 further includes a first internal cavity portion 88 and a second internal cavity portion 90, both disposed on the lengthwise axis 48. The first internal cavity (FIC) portion 88 extends an axial distance "A2" from the first axial end surface 84 to a base surface 92. The first internal cavity portion 88 has a FIC inner diameter surface 94 disposed at an inner diameter (FIC1). The second internal cavity (SIC) portion 90 is disposed axially inward from the first axial end surface 84 an axial distance "A3" and extends an axial distance "A4". The second internal cavity portion 90 has a SIC inner diameter surface 96 disposed at an inner diameter (SIC1). The FIC inner diameter is less than the SIC inner diameter (SIC1>FIC1). As a result, shoulder surfaces 98 are disposed therebetween. It should be noted, however, that the segment of the first internal cavity portion 88 disposed between the second internal cavity portion 90 and the first axial end surface 84 (i.e., the segment extending an axial distance "A3") is shown as having the same diameter as the segment of the first internal cavity portion 88 disposed on the opposite side of the second internal cavity portion 90. The present disclosure is not limited to these two first internal cavity portion 88 segments having the same diameter; e.g., the segment of the first internal cavity portion 88 disposed between the second internal cavity portion 90 and the first axial end surface 84 (i.e., the segment extending an axial distance "A3") may have a different diameter, for example a larger diameter. In the embodiment shown in FIG. 8, the spring housing 70 is diagrammatically shown as a unitary body, with the portion of the first internal cavity 88 extending between the first axial end surface 84 to the second internal cavity portion 90 part of that unitary body. The present disclosure is not limited to a spool 40 configured as a unitary body. For example, the portion of the spring housing 70 defining the first internal cavity portion 88 between the first axial end surface 84 to the second internal cavity portion 90 may be an independent component attached by fastener, or the like; e.g., to facilitate assembly.

In some embodiments, balancing grooves (not shown) may be disposed in the outer radial surface 82 of the spool spring housing 70 and in the outer radial surface 74 of the end cap 68. The balancing grooves are not required but may be included to facilitate movement of the spool 40.

Figure 9:
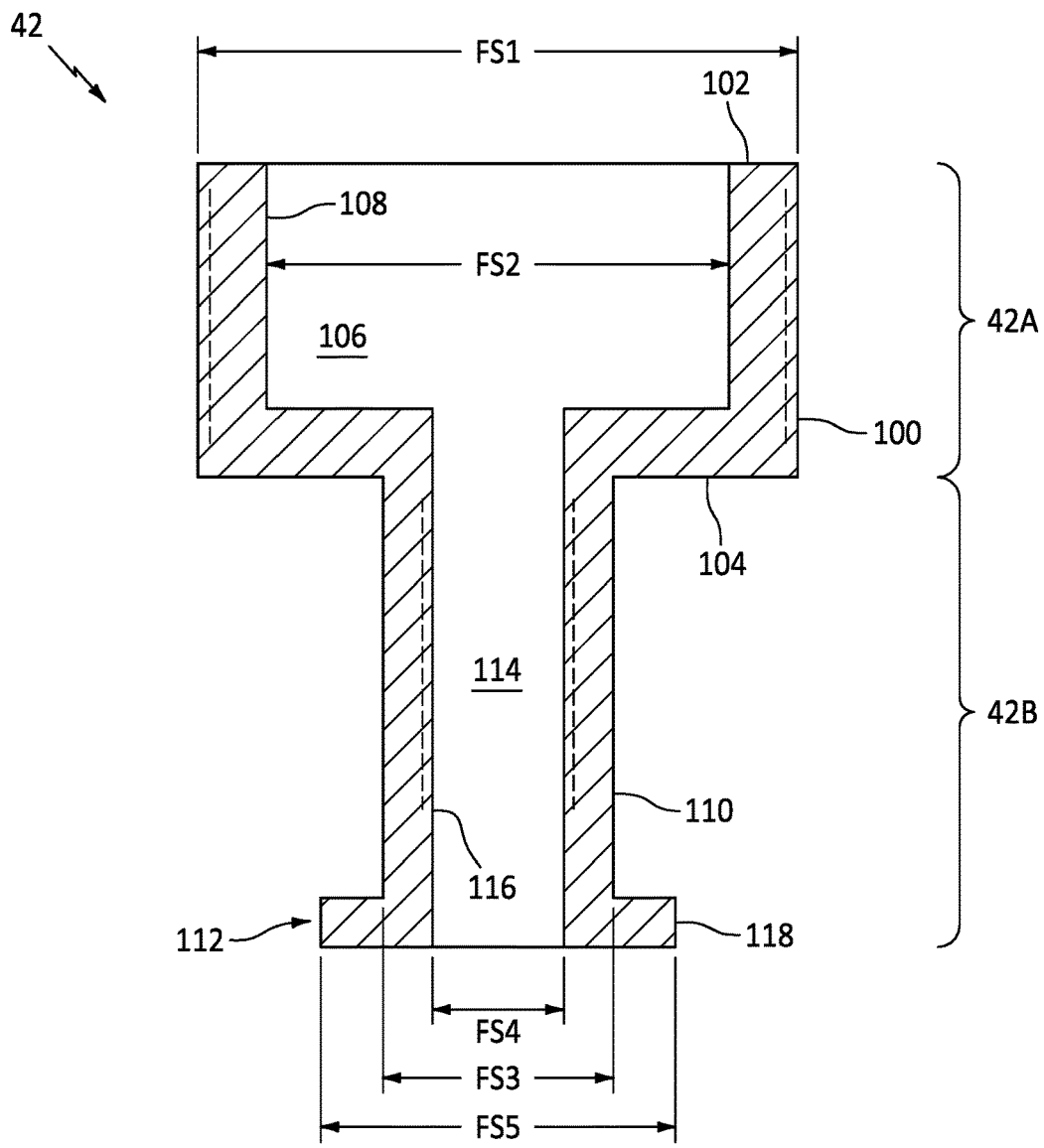
FIG. 9 is a diagrammatic view of a first adjustment piston component embodiment that may be used in a present disclosure multi-adjustable valve.
Figure 9A:
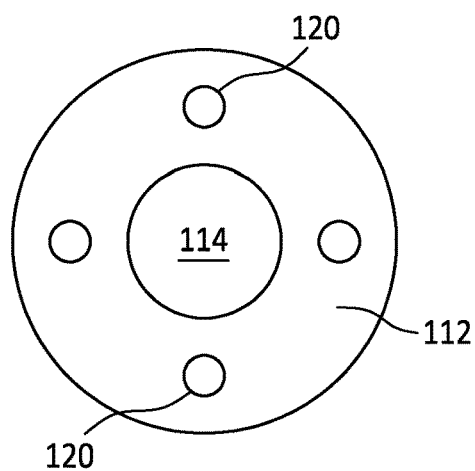
FIG. 9A is a planar view of a distal end flange embodiment of a first adjustment piston component embodiment like that shown in FIG. 9.

Referring to FIG. 9, the first adjustment piston 42 (FAP) has a FAP first segment 42A and a FAP second segment 42B. The FAP first segment 42A has an outer radial surface 100 that extends lengthwise between an end surface 102 and a shoulder surface 104. The FAP first segment outer radial surface 100 is disposed at a diameter FS1. At least a portion of the FAP first segment outer radial surface 100 is configured for threaded engagement with the housing FS inner diameter surface 56 as will be detailed herein. The FAP first segment 42A includes a first interior cavity 106 having an inner diameter surface 108 disposed at a diameter FS2. The first interior cavity 106 is open at the end surface 102 and extends axially inward a distance. The FAP second segment 42B has an outer radial surface 110 that extends lengthwise from the shoulder surface 104 to a distal end flange 112. The FAP second segment outer radial surface 110 is disposed at a diameter FS3. The FAP second segment 42B includes a second interior cavity 114 having an inner diameter surface 116 disposed at a diameter FS4. The second interior cavity 114 is open at the distal end flange 112 and is open to the first interior cavity 106 of the FAP first segment 42A. At least a portion of the inner diameter surface 116 of the second interior cavity 114 is configured for threaded engagement with the shaft of the second adjustment piston 44 as will be detailed herein. The distal end flange 112 has an outer radial surface 118 disposed at a diameter FS5. Referring to FIG. 9A, in some embodiments the distal end flange 112 may include one or more vent apertures 120 configured to vent any pressure difference between the interior cavities of the spring housing 70 and the interior of the housing 38; e.g., pressure differences that may result from thermal gradient, or assembly or spool 40 movement.

Figure 10:
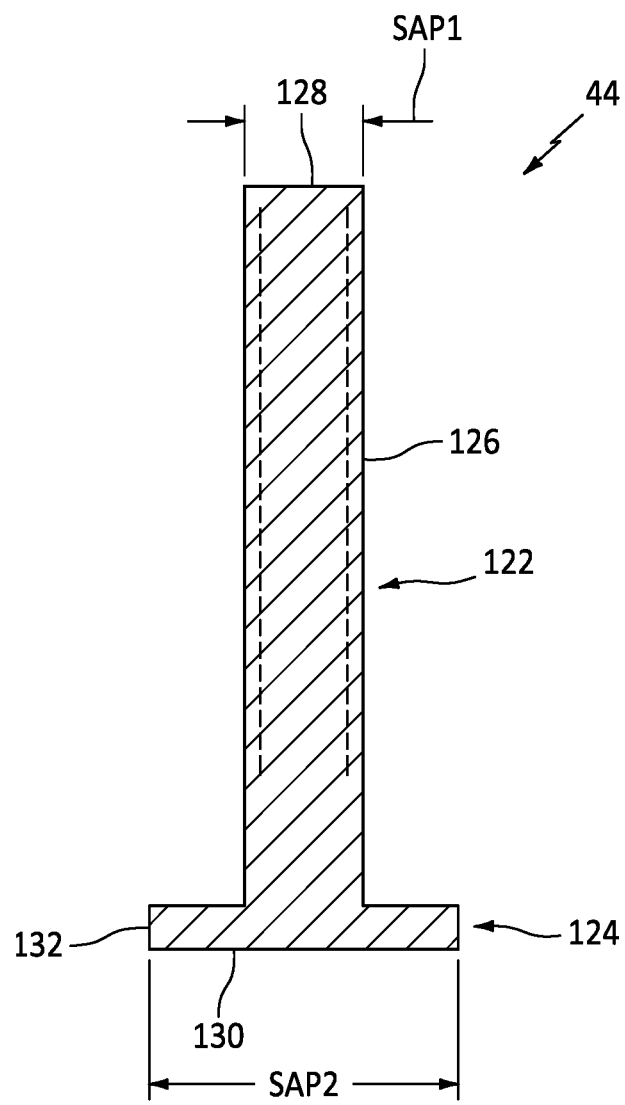
FIG. 10 is a diagrammatic view of a second adjustment piston component embodiment that may be used in a present disclosure multi-adjustable valve.

Referring to FIG. 10, the second adjustment piston 44 (SAP) has a shaft 122 and a head 124. The shaft 122 has an outer radial surface 126 disposed at a diameter SAP1 that extends lengthwise between an end surface 128 and the head 124. At least a portion of the shaft outer radial surface 126 is configured for threaded engagement with the inner diameter surface 116 of the second interior cavity 114 of the second adjustment piston 44 as will be detailed herein. The head 124 has an axial end surface 130 and an outer radial surface 132. The head outer radial surface is disposed at a diameter SAP2.

Referring to FIG. 6, when the multi-adjustable valve 36 is disposed in assembled form, the spool 40 is disposed for axial movement within the second housing segment 38B of the housing 38. The end cap 68 is disposed axially below the housing fluid inlet port 66 and the spring housing 70 may be axially aligned with the housing fluid outlet port 64 to close or partially close the housing fluid outlet port 64, or may be disposed axially above the housing fluid outlet port 64 so it is fully open.

Referring to FIG. 6, when the multi-adjustable valve 36 is disposed in assembled form, the first and second adjustment pistons 42, 44 are disposed within the interior cavities 54, 58 of the housing 38. The FAP first segment 42A of the first adjustment piston 42 is disposed within the first housing segment 38A. A portion of the outer radial surface 100 of the FAP first segment 42A is threadedly engaged with the housing FS inner diameter surface 56. The threaded engagement allows axial movement and positioning of the first adjustment piston 42 relative to the housing 38. As diagrammatically shown in FIG. 6, in some embodiments a seal 134 (e.g., packing or the like) may be disposed between the outer radial surface 100 of the FAP first segment and the FS inner diameter surface 56 to inhibit fluid flow therebetween. The shaft 122 of the second adjustment piston 44 is received within the second interior cavity 114 of the first adjustment piston 42 and is threadedly engaged with the inner diameter surface 116 of the second interior cavity 114 of the first adjustment piston 42. The threaded engagement allows axial movement and positioning of the first adjustment piston 42 and second adjustment piston 44 relative to one another. As diagrammatically shown in FIG. 6, in some embodiments a seal 136 (e.g., packing or the like) may be disposed between the shaft 122 of the second adjustment piston 44 and the inner diameter surface 116 of the second interior cavity 114 of the first adjustment piston 42 to inhibit fluid flow therebetween.

Figure 6A:
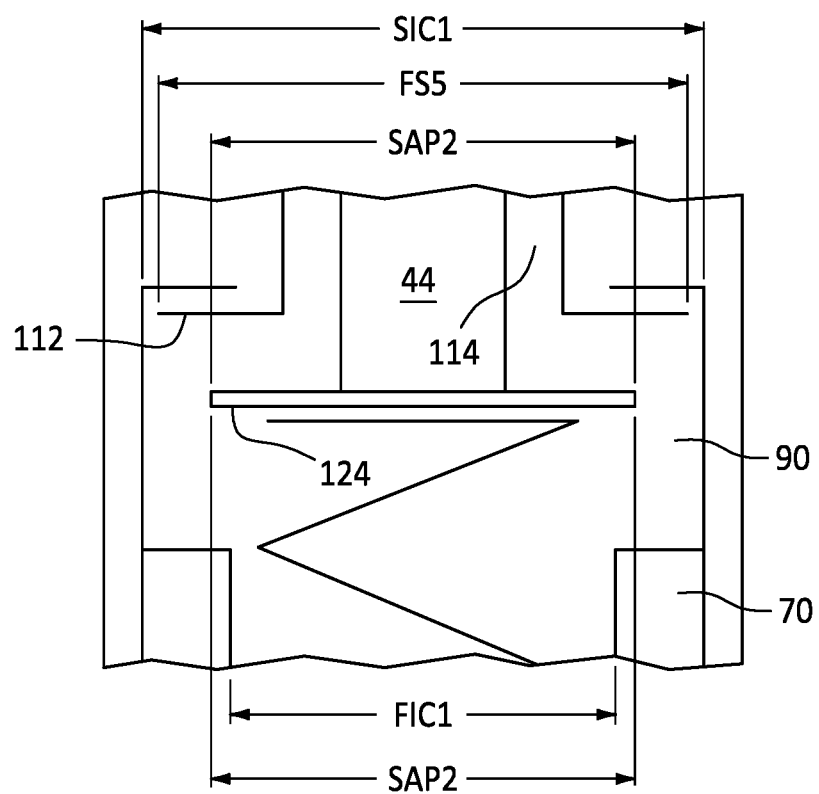
FIG. 6A is an enlarged partial view of the valve embodiment shown in FIG. 6.

Referring to FIGS. 6 and 6A, when the multi-adjustable valve 36 is disposed in assembled form, the distal end flange 112 of the first adjustment piston 42 is disposed within the second internal cavity portion 90 of the spool spring housing 70. The outer radial diameter (FS5) of the distal end flange 112 is less than the inner diameter (SIC1) of the second internal cavity portion 90 of the spool spring housing 70 (i.e., FS5<SIC1). Hence, in assembled form the distal end flange 112 is disposed and retained within the second internal cavity portion 90 of the spool spring housing 70. In addition, when the multi-adjustable valve 36 is disposed in assembled form, the head 124 of the second adjustment piston 44 is also disposed and retained within the second internal cavity portion 90 of the spool spring housing 70.

The biasing member 46 is disposed within the spool spring housing 70 between the head 124 of the second adjustment piston 44 and the base surface 92 of the first internal cavity portion 88 of the spring housing 70. The biasing member 46 is in contact with and provides a biasing force between the head 124 of the second adjustment piston 44 and the base surface 92 of the first internal cavity portion 88 of the spring housing 70.

The adjustability of the first adjustment piston 42 relative to the housing 38 enables the present disclosure multi-adjustable valve 36 to provide a pressure adjusting valve (PAV) effect and the adjustability of the second adjustment piston 44 relative to the first adjustment piston 42 enables the present disclosure multi-adjustable valve 36 to provide a pressure regulating valve (PRV) effect. In this manner, the present disclosure multi-adjustable valve 36 provides the benefits of a PAV and a PRV without the need to provide both a PAV and a PRV (independent of one another), and also overcomes the disadvantages of a PAV alone or a PRV alone. For example, in a prior art PAV controlled system, the oil inlet pressure to a component cavity is linked to the oil pump speed. The amount of oil flow/oil pressure necessary to satisfy the lubrication and/or cooling requirements for each component cavity typically varies. To achieve the desired oil flow/oil pressure for each component cavity, control hardware (e.g., variable size orifices) may be used with each component cavity. Given the fact that each lubrication system is unique (e.g., different tolerances, and the like), the control hardware for each component cavity will need to be sized uniquely. This process can be time consuming and arduous. Prior art PRV controlled systems, in contrast, fluctuate to maintain a constant difference in pressure between low and high reference points. The high reference point is a fluid pressure source that may be associated with oil static pressure and the low reference point is a fluid pressure source that may be associated with ambient pressure. The high reference point and low reference point may be chosen for a variety of reasons. For example, the high and low reference points may be chosen to protect a specific component/cavity in which case the aforesaid reference points may be upstream and downstream of the cavity/component. If the intent is to provide a constant pressure to the entire engine, the reference points may be chosen such that the high reference point will be "upstream of everything" (e.g., the pump exit) and the low reference point will be "downstream of everything"; i.e., a vent to ambient, or a tank point. Referring to FIG. 6, the low reference point imposes its pressure in the first internal cavity portion 88 of the spring housing 70, while the high pressure reference imposes its pressure in the region below the spool cap 68 of the spool 40. A significant drawback of prior art PRV systems is that a substantial amount of oil flow is bypassed through the PRV; e.g., about X percent at ground idle and about 4x percent under take-off conditions. Hence, the design point for a prior art PRV system is typically the bypass flow at ground idle, and the system is oversized for take-off conditions. As a result, the oil pressure pump is oversized for take-off conditions; e.g., heavier than desired and likely more expensive (e.g., power consumption) than desired.

Figure 11:
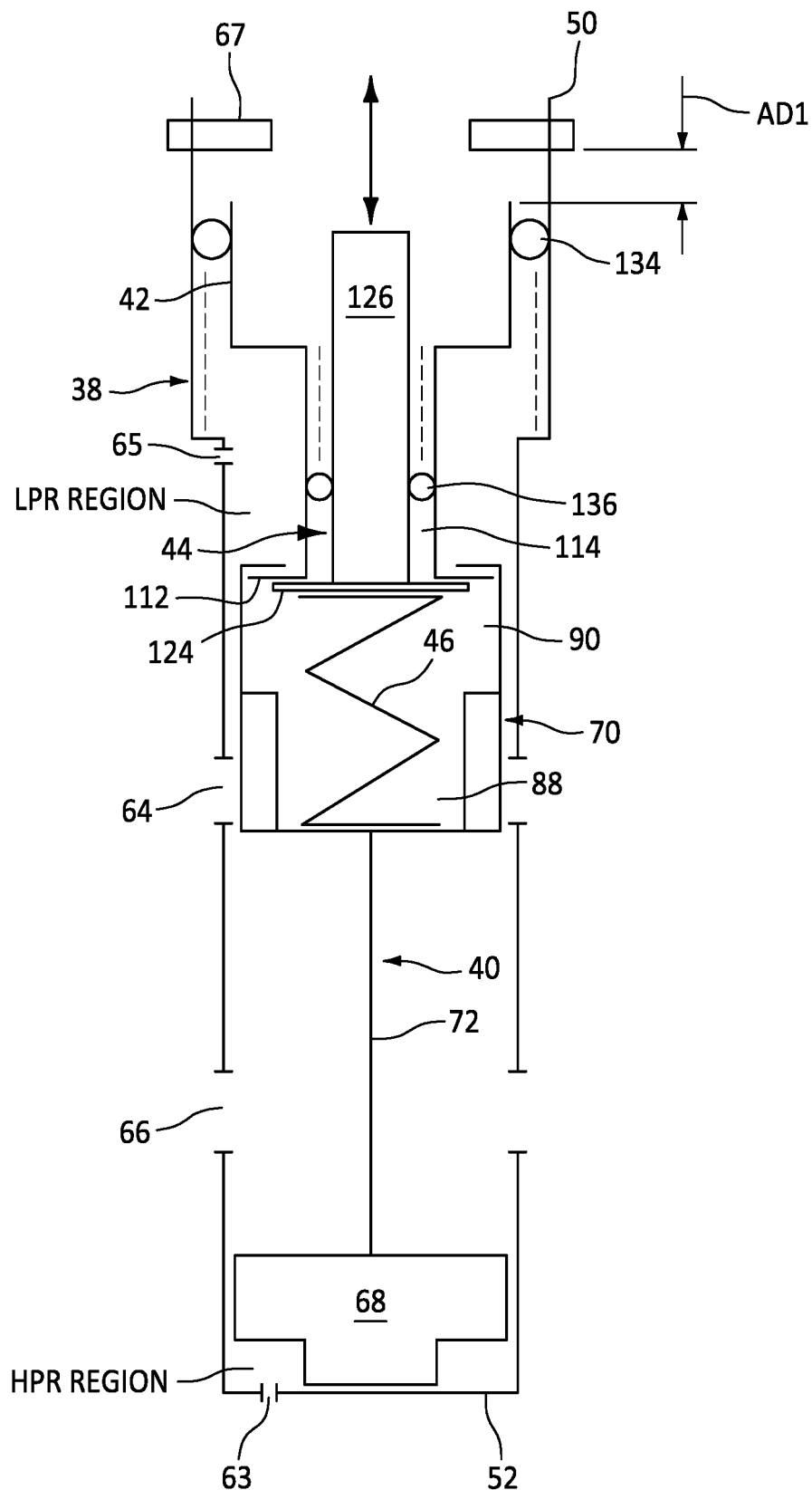
FIGS. 11-11D are diagrammatic views of a present disclosure multi-adjustable valve embodiment, illustrating components of the multi-adjustable valve positionally varied.

FIG. 11A-D diagrammatically illustrate a present disclosure multi-adjustable valve 36 and relative movements of components thereof. FIG. 11 diagrammatically illustrates the present disclosure multi-adjustable valve 36 in an unadjusted configuration. In this configuration, the first adjustment piston 42 is disposed an axial distance (AD1) extending from the retaining ring 67 at the housing first end 50 toward the housing second end 52. Because the second adjustment piston 44 is in threaded engagement with the first adjustment piston 42, the second adjustment piston 44 travels axially with the first adjustment piston 42. FIG. 11 shows the spool spring housing 70 blocking the fluid outlet port(s) 64 of the housing 38, and the end cap 68 of the spool 40 is disposed proximate to the second end 52 of the housing 38.

The region (referred to hereinafter as the "HPR region") below the end cap 68 of the present disclosure valve is subject to fluid pressure at a high pressure reference, and the region (referred to hereinafter as the "LPR region") between the spool spring housing 70 and the first segment 42A of the first adjustment piston 42 is subject to fluid pressure at a low pressure reference; e.g., see also FIG. 6. Consequently, there will be a fluid pressure difference across the spool 40 between the HPR region and the LPR region in most operating conditions. If the biasing member 46 is uncompressed, it can be assumed that the biasing member 46 exerts no force against the spool 40 in a direction toward the second end 52 of the housing 38.

Figure 11A:
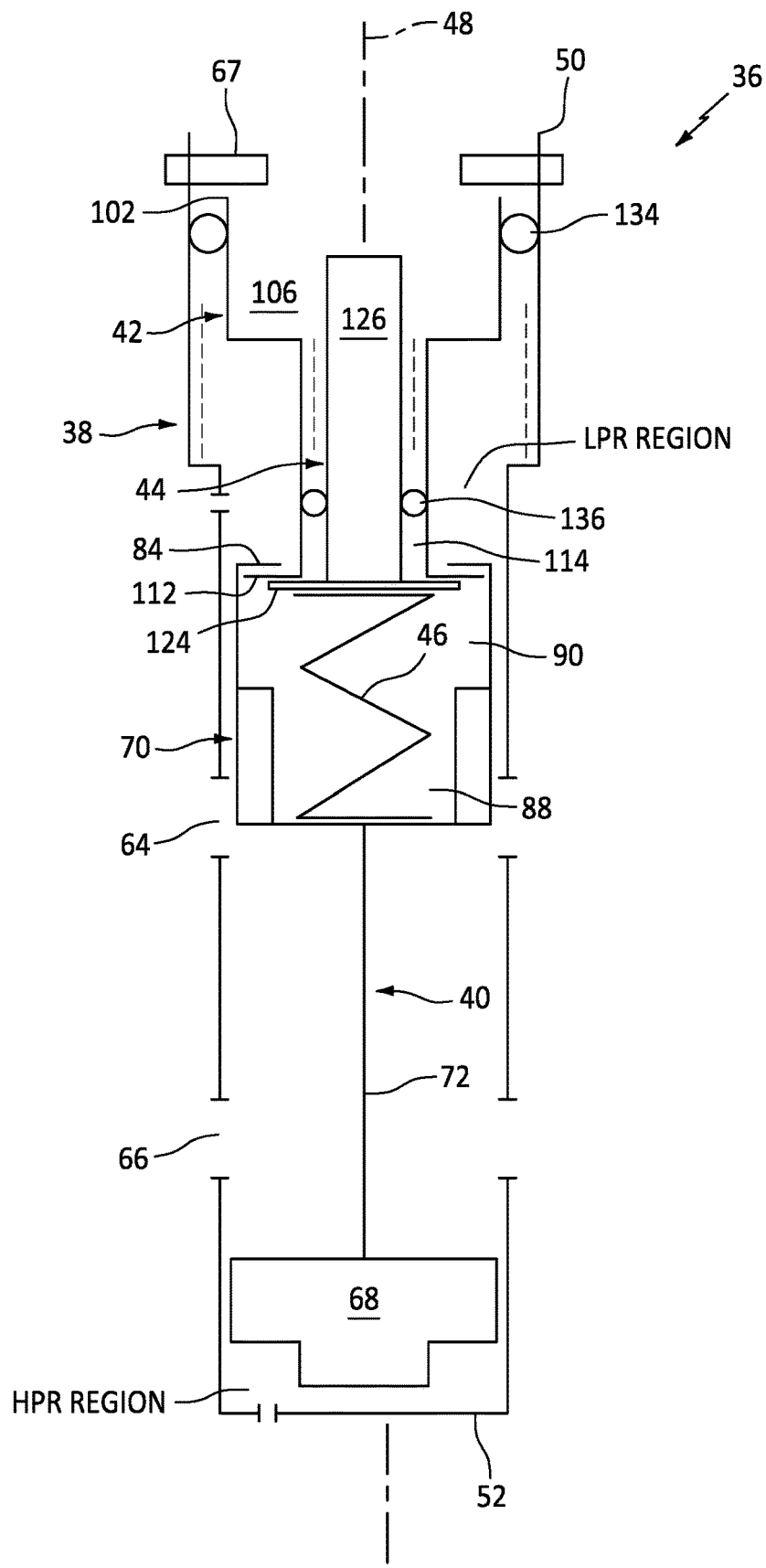

FIG. 11A shows an adjusted present disclosure valve 36. In this adjusted configuration, the end surface 102 of the first adjustment piston 42 is disposed proximate to the first end 50 of the housing 38, the head 124 of the second adjustment piston 44 is proximate to the first axial end surface 84 of the spool spring housing 70, the end cap 68 of the spool 40 is spaced apart from the second end 52 of the housing 38, and the biasing member 46 is not compressed. In this configuration, the spool spring housing 70 partially blocks the fluid outlet port(s) 64 of the housing 38.

Figure 11B:
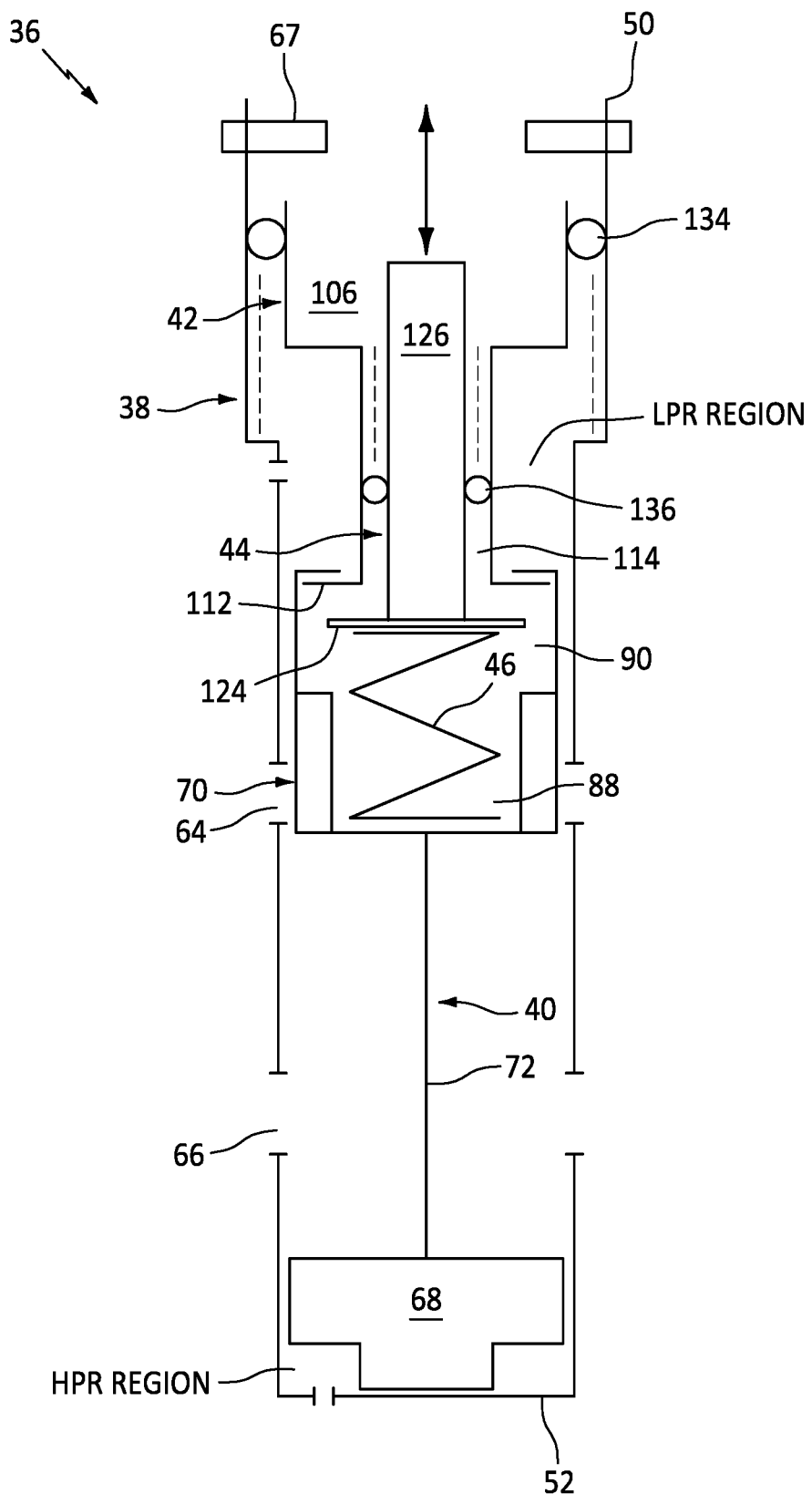

FIG. 11B illustrates the first adjustment piston 42 in the same position as shown in FIG. 11. In FIG. 11B, however, the second adjustment piston 44 is axially moved (e.g., via screw travel) relative to the first adjustment piston 42 toward the second end 52 of the housing 38. The axial movement of the second adjustment piston 44 causes the biasing member 46 to compress. Like FIG. 11, FIG. 11B shows the spool spring housing 70 blocking the fluid outlet port(s) 64 of the housing 38, and the end cap 68 of the spool 40 disposed proximate to the second end 52 of the housing 38. The diagrammatic representation of the multi-adjustable valve 36 shown in FIG. 11B is indicative of a scenario wherein the speed of the pressure pump 34 is below the target point as shown in FIG. 5A.

Figure 11C:
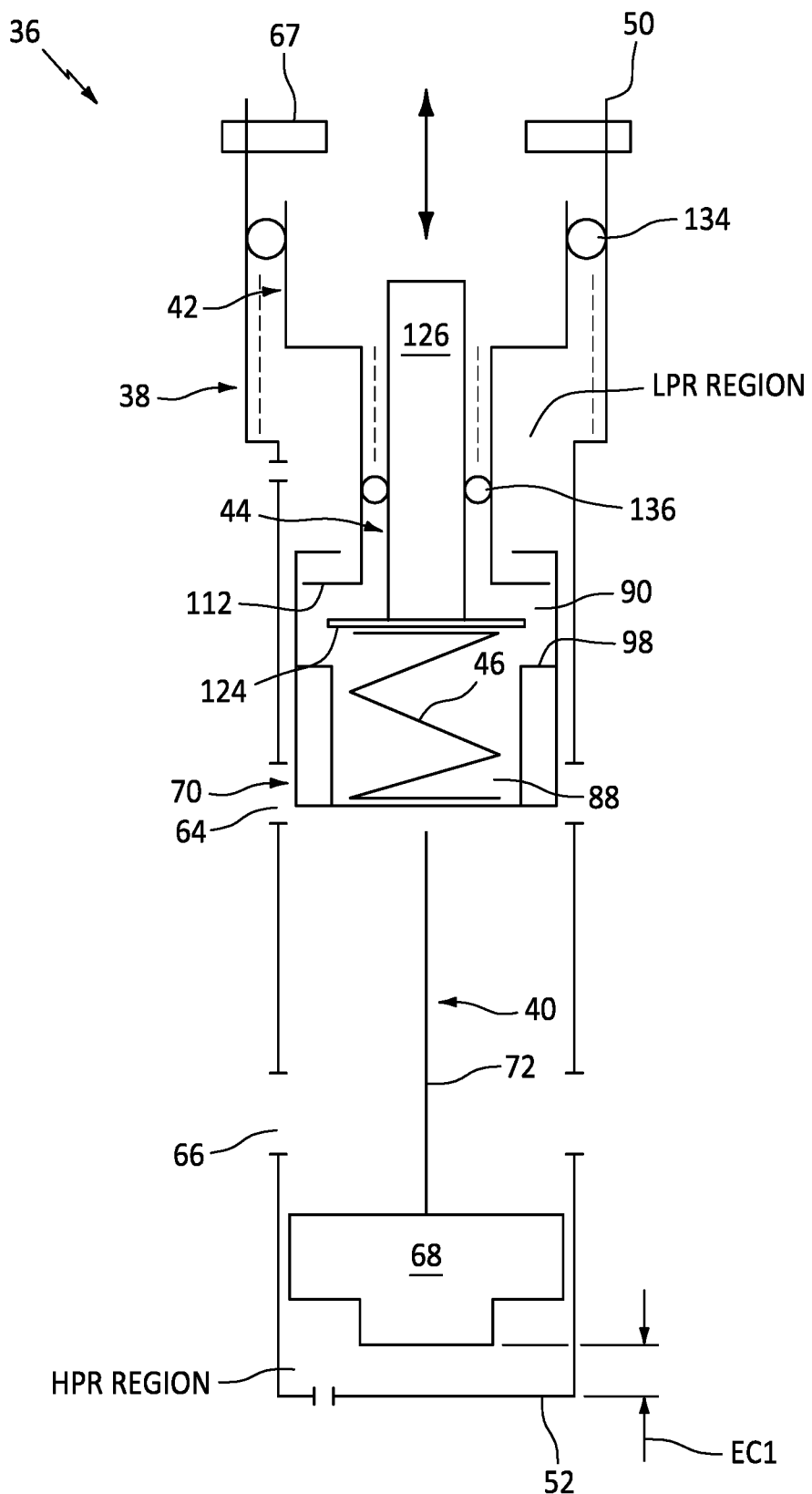

FIG. 11C illustrates the first adjustment piston 42 in the same position as shown in FIG. 11B, and the second adjustment piston 44 in the same position as shown in FIG. 11B. In FIG. 11C, however, the spool 40 has moved axially toward the first end 50 of the housing 38 to a position wherein the spool spring housing 70 does not entirely block the fluid outlet port(s) 64 of the housing 38, and the end cap 68 of the spool 40 is now spaced apart from the second end 52 of the housing 38 by a distance EC1. The axial movement of the spool 40 toward the first end 50 of the housing 38 causes further compression of the biasing member 46. The axial movement of the spool 40 results from the fluid pressure in the HPR region being greater than the combined force of the fluid pressure in the LPR region and the biasing force. The diagrammatic representation of the multi-adjustable valve 36 shown in FIG. 11C is indicative of a scenario wherein the speed of the pressure pump 34 is above the target point as shown in FIG. 5A.

Figure 11D:
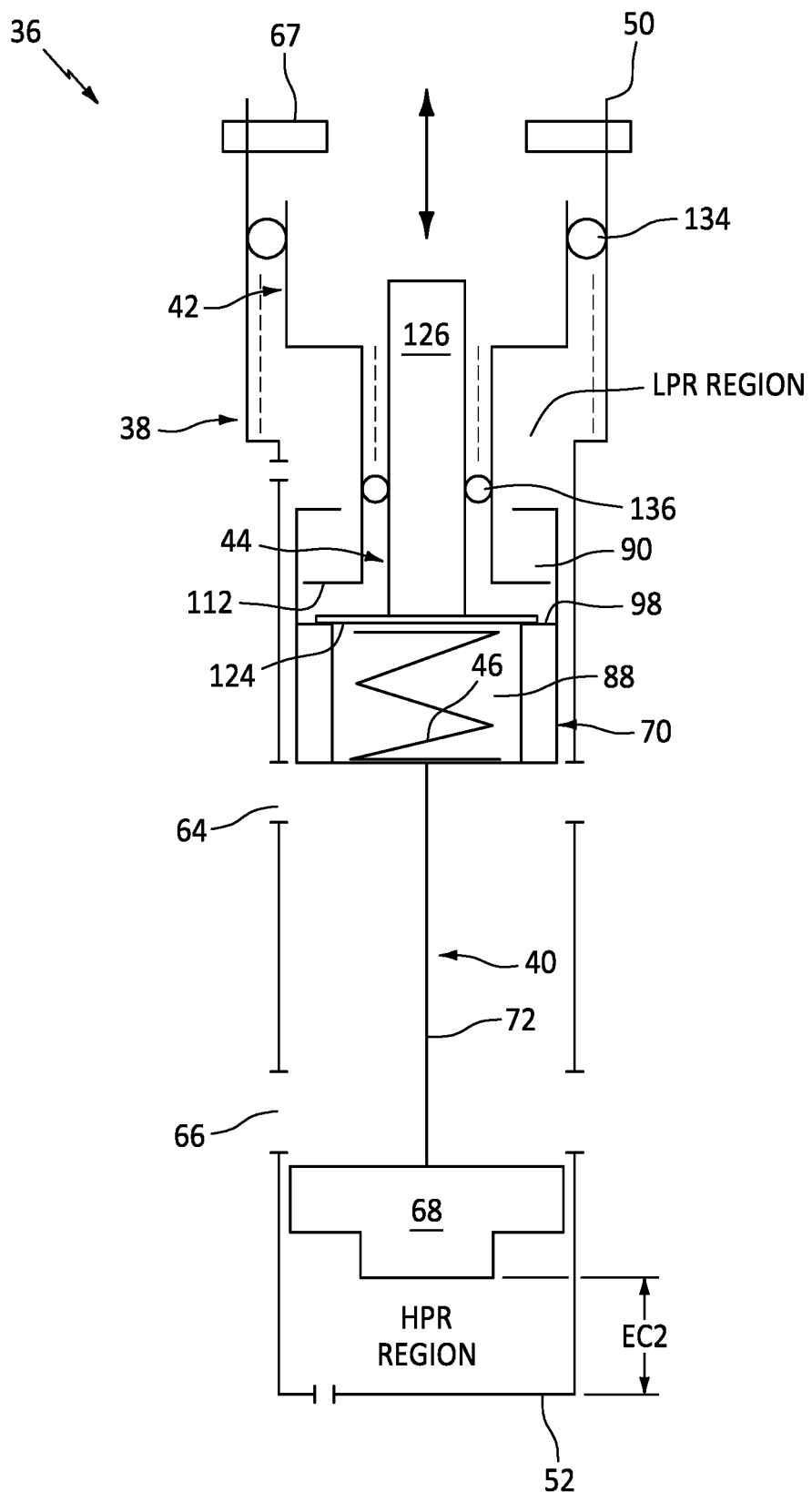

FIG. 11D illustrates the first adjustment piston 42 in the same position as shown in FIGS. 11B and 11C, and the second adjustment piston 44 in the same position as shown in FIGS. 11B and 11C. In FIG. 11D, however, the spool 40 has moved axially toward the first end 50 of the housing 38 to a position wherein the spool spring housing 70 does not block the fluid outlet port(s) 64 of the housing 38. In this position, the end cap 68 of the spool 40 is now spaced apart from the second end of the housing 38 by a distance EC2, where EC2>EC1. The axial movement of the spool 40 toward the first end 50 of the housing 38 causes further compression of the biasing member 46. The axial movement of the spool 40 results from the fluid pressure in the HPR region being greater than the combined force of the fluid pressure in the LPR region and the biasing force. Note that the present disclosure multi-adjustable valve 36 may be configured to limit the extent to which the biasing member 46 may be compressed; e.g., to avoid the biasing member 46 from being fully compressed. For example, the diameter (SAP2) of the second adjustment piston head 124 may be selected to be greater than the diameter (FIC1—see FIG. 6A) of the FIC inner diameter surface 94, in which case adjustment of the second adjustment piston 44 towards the spool spring housing 70 will not be permitted past the point where the head 124 of the second adjustment piston 44 contacts the shoulder surface 98 disposed between the spring spool housing second internal cavity portion 90 and the first internal housing cavity portion 88. The diagrammatic representation of the multi-adjustable valve 36 shown in FIG. 11D is indicative of a scenario wherein the speed of the pressure pump 34 is above the target point as shown in FIG. 5A. FIG. 11D indicates a scenario where the speed of the pressure pump 34 is even higher above the target point than indicated in FIG. 11C and the fluid pressure from the high reference point is higher than that in FIG. 11C.

As stated above, the adjustability of the first adjustment piston 42 relative to the housing 38 enables the present disclosure multi-adjustable valve 36 to provide a pressure adjusting valve (PAV) effect and the adjustability of the second adjustment piston 44 relative to the first adjustment piston 42 enables the present disclosure multi-adjustable valve 36 to provide a pressure regulating valve (PRV) effect. An example of an adjustment sequence for the present disclosure multi-adjustable valve 36 includes initially adjusting the axial position of the first adjustment piston 42 relative to the housing 38 via the threaded engagement between the first adjustment piston 42 and the housing 38. As detailed above relative to FIG. 11A, the first adjustment piston 42 has moved an axial distance (AD1) away from the housing first end 50, toward the housing second end 50. This adjustment (up or down axially) may be used to change the position of the spool spring housing 70 relative to the fluid outlet port 64 and thereby adjust the amount of bypass fluid flow through the valve 36 at rest. This adjustment alters the amount of fluid flow between the housing fluid inlet port 66 and the housing outlet port 64 at rest. The term "at rest" or "bypass flow at rest" refers to the fluid flow through the valve 36 when the biasing member 46 has not been compressed by the difference in pressure between the high and low pressure references. This valve 36 setting adjustment may be performed with the engine operating at a ground idle condition. This valve 36 setting adjustment sets the difference in pressure (dP) versus engine speed (RPMs) slope from 0 to a "target point"; e.g., see the chart shown in FIG. 5A. The next step in the adjustment procedure may include adjusting the axial position of the second adjustment piston 44 relative to the first adjustment piston 42 via the threaded engagement therebetween. The axial position of the second adjustment piston 44 relative to the first adjustment piston 42 can be adjusted to set a desired constant dP versus pump RPM level; e.g., see FIG. 5A. The adjustment of the second adjustment piston 44 sets the axial spring length (i.e., the amount of spring compression), and therefore the amount of spring bias force. To move the spool 40 axially, the high pressure reference equivalent force would need to be great enough to overcome the low pressure reference equivalent force and the biasing force; e.g., see FIG. 11D. This valve 36 adjustment pressure setting could be based on engine take-off conditions.

As described above, the first adjustment piston 42 is in threaded engagement with housing 38 and the second adjustment piston 44 is in threaded engagement with the first adjustment piston 42. The aforesaid threaded engagements allow selective positioning of the first adjustment piston 42 and the second adjustment piston 44 relative to each other and relative to other components. The present disclosure is not limited to having the first adjustment piston 42 in threaded engagement with housing 38 and the second adjustment piston 44 in threaded engagement with the first adjustment piston 42. A non-limiting example of how relative positioning and biasing can be achieved, washers may be disposed between a shoulder 62 surface between the first and second housing segments 38A, 38B and the second axial end surface 86 of the spool spring housing 70, and/or between a shoulder surface 98 of the spring housing second internal cavity portion 90 and the upper axial surface of the distal end flange 112 of the first adjustment piston 42.

FIGS. 12-12C illustrate an alternative multi-adjustable valve 236 embodiment having a housing 238, a spool 240, a first adjustment piston 242, a second adjustment piston 244, and a biasing member 246. In this multi-adjustable valve 236, the first adjustment piston 242 is disposed adjacent the second end 252 of the housing 238, the second adjustment piston 244 is disposed adjacent the first end 250 of the housing 238, and the spool 240 and biasing member 246 are disposed between the first and second adjustment pistons 242, 244. The first adjustment piston 242 is in threaded engagement with the housing 238 adjacent the second end 252 of the housing 238, and the second adjustment piston 244 is in threaded engagement with the housing 238 adjacent the first end 250 of the housing 238. The first adjustment piston 242 may be initially adjusted (e.g., moved axially via the threaded engagement) to dispose the spool spring housing 270 at a bypass at rest position (see FIG. 12A). Subsequently, the second adjustment piston 244 may be adjusted (e.g., moved axially via the threaded engagement) to set the desired dP versus pump RPM level (see FIG. 12B). FIG. 12C illustrates the valve 238 in a full bypass configuration, with the spool 240 moved axially toward the first end 250 of the housing 238 and the biasing member 246 compressed. This alternative multi-adjustable valve 236 embodiment, in contrast with the embodiments shown in FIGS. 11-11D, is configured such that positional adjustment of either adjustment piston 242, 244 can influence the preload of the biasing member 246.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A multi-adjustable valve for metering a flow of fluid within a lubrication system, the valve having a longitudinal axis, the valve comprising:

a biasing member;

a housing having an interior cavity, a fluid inlet port, and a fluid outlet port, the interior cavity extending from a first end of the housing to a second end of the housing;

a first adjustable piston configured for threaded engagement with the housing interior cavity adjacent to the first end of the housing, the first adjustable piston axially moveable within the housing interior cavity via the threaded engagement with the housing interior cavity;

a second adjustable piston having a shaft and a head disposed at a distal end of the shaft, the shaft configured for threaded engagement with the first adjustable piston, the second adjustable piston axially moveable via the threaded engagement between the shaft and the first adjustable piston; and a spool having a spool shaft connected to and extending between a spring housing (SH) and an end cap, the end cap disposed adjacent to the second end of the housing, and the spring housing having an SH interior cavity configured to receive the biasing member, wherein the spool is configured for axial movement within the housing interior cavity;

wherein the second adjustable piston head is disposed in the spring housing and the biasing member is disposed between the second adjustable piston head and a base surface of the spring housing, wherein in a compressed state the biasing member produces a biasing force that biases the spool toward the second end of the housing;

wherein the multi-adjustable valve is configured to receive said fluid at a first pressure between the spring housing and the first end of the housing, and to receive said fluid at a second pressure between the spool end cap and the second end of the housing, and during use the multi-adjustable valve meters flow of the fluid by the spool spring housing entirely blocking the housing fluid outlet port, or partially blocking the housing fluid outlet port, or not blocking the housing fluid outlet port as a function of a difference between the first pressure and the second pressure and the biasing force.

2. The multi-adjustable valve of claim 1, wherein the housing includes a first housing segment and a second housing segment, wherein the first housing segment extends between the first end of the housing and the second housing segment and the second housing segment extends between the second end of the housing and the second housing segment, and the housing interior cavity includes a first interior cavity (FIC) disposed in the first housing segment and a second interior cavity (SIC) disposed in the second housing segment, wherein the first interior cavity has an FIC inner diameter and the second interior cavity has an SIC inner diameter, and the FIC inner diameter is greater than the SIC inner diameter.

3. The multi-adjustable valve of claim 2, wherein the fluid inlet port and the fluid outlet port are disposed in the second housing segment, and the fluid outlet port is axially disposed between the fluid inlet port and the first housing segment.

4. The multi-adjustable valve of claim 2, wherein the first interior cavity disposed in the first housing segment has a FIC inner diameter surface that defines the FIC inner diameter, and the FIC inner diameter surface is configured for the threaded engagement with the first adjustable piston.

5. The multi-adjustable valve of claim 4, wherein the first adjustable piston (FAP) includes an FAP interior cavity and the second adjustable piston shaft is in threaded engagement with the FAP interior cavity.

6. The multi-adjustable valve of claim 5, wherein the first adjustable piston extends axially between an FAP first axial end and an FAP second axial end, and includes a distal end flange disposed at the FAP second axial end, the distal end flange disposed within the SH interior cavity, wherein the threaded engagement between the second adjustable piston shaft and the FAP interior cavity permits selective axial positioning of the second adjustable piston head relative to the distal end flange within the SH interior cavity.

7. The multi-adjustable valve of claim 6, wherein the SH interior cavity includes a first SH interior cavity and a second SH interior cavity, the first SH interior cavity having a first SH interior cavity inner diameter and the second SH interior cavity having a second SH interior cavity inner diameter, wherein the second SH interior cavity inner diameter is greater than the first SH interior cavity diameter; and wherein the distal end flange (DEF) has a DEF outer radial diameter, and the DEF outer radial diameter is less than the second SH interior cavity inner diameter, and the DEF outer radial diameter is equal or greater than the first SH interior cavity diameter.

8. The multi-adjustable valve of claim 7, wherein the second adjustable piston (SAP) head has an SAP head outer radial surface disposed at an SAP head outer radial diameter, and the SAP head outer radial diameter is greater than the first SH interior cavity diameter.

9. The multi-adjustable valve of claim 6, wherein the distal end flange includes one or more vent apertures.

10. The multi-adjustable valve of claim 1, wherein the spool end cap (EC) is T-shaped with a first EC portion having a first EC portion outer radial surface disposed at a first EC portion outer radial diameter, and a second EC portion extending axially outward from the first EC portion, the second EC portion having a second EC portion outer radial surface disposed at a second EC portion outer radial diameter, wherein the first EC portion outer radial diameter is greater than the second EC portion outer radial diameter.

11. A lubrication system for providing a fluid to one or more component cavities associated with an aircraft propulsion system, comprising:

a tank configured to hold a volume of the fluid;

a pressure pump configured to pump the fluid to the one or more component cavities; and a multi-adjustable valve configured to control a pressure differential of a flow of the fluid across at least one of the component cavities, the multi-adjustable valve including:

a longitudinal axis;

a biasing member;

a housing having an interior cavity, a fluid inlet port, and a fluid outlet port, the interior cavity extending from a first end of the housing to a second end of the housing;

a first adjustable piston configured for threaded engagement with the housing interior cavity adjacent to the first end of the housing, the first adjustable piston axially moveable within the housing interior cavity via the threaded engagement with the housing interior cavity;

a second adjustable piston having a shaft and a head disposed at a distal end of the shaft, the shaft configured for threaded engagement with the first adjustable piston, the second adjustable piston axially moveable via the threaded engagement between the shaft and the first adjustable piston; and a spool having a spool shaft connected to and extending between a spring housing (SH) and an end cap, the end cap disposed adjacent to the second end of the housing, and the spring housing having an SH interior cavity configured to receive the biasing member, wherein the spool is configured for axial movement within the housing interior cavity;

wherein the second adjustable piston head is disposed in the spring housing and the biasing member is disposed between the second adjustable piston head and a base surface of the spring housing, wherein in a compressed state the biasing member produces a biasing force that biases the spool toward the second end of the housing;

wherein the valve is configured to receive the fluid at a first pressure between the spring housing and the first end of the housing, and to receive the fluid at a second pressure between the spool end cap and the second end of the housing, and during use the multi-adjustable valve is configured to meter the flow of the fluid through the housing fluid inlet port and the housing fluid outlet port by the spool spring housing entirely blocking the housing fluid outlet port, or partially blocking the housing fluid outlet port, or not blocking the housing fluid outlet port as a function of a difference between the first pressure and the second pressure and the biasing force.

12. The system of claim 11, wherein housing includes a first housing segment and a second housing segment, wherein the first housing segment extends between the first end of the housing and the second housing segment and the second housing segment extends between the second end of the housing and the second housing segment, and the housing interior cavity includes a first interior cavity (FIC) disposed in the first housing segment and a second interior cavity (SIC) disposed in the second housing segment, wherein the first interior cavity has an FIC inner diameter and the second interior cavity has an SIC inner diameter, and the FIC inner diameter is greater than the SIC inner diameter.

13. The system of claim 12, wherein the fluid inlet port and the fluid outlet port are disposed in the second housing segment, and the fluid outlet port is axially disposed between the fluid inlet port and the first housing segment.

14. The system of claim 12, wherein the first interior cavity disposed in the first housing segment has a FIC inner diameter surface that defines the FIC inner diameter, and the FIC inner diameter surface is configured for the threaded engagement with the first adjustable piston.

15. The system of claim 14, wherein the first adjustable piston (FAP) includes an FAP interior cavity and the second adjustable piston shaft is in threaded engagement with the FAP interior cavity.

16. The system of claim 15, wherein the first adjustable piston extends axially between an FAP first axial end and an FAP second axial end, and includes a distal end flange disposed at the FAP second axial end, the distal end flange disposed within the SH interior cavity, wherein the threaded engagement between the second adjustable piston shaft and the FAP interior cavity permits selective axial positioning of the second adjustable piston head relative to the distal end flange within the SH interior cavity.

17. The system of claim 16, wherein the SH interior cavity includes a first SH interior cavity and a second SH interior cavity, the first SH interior cavity having a first SH interior cavity inner diameter and the second SH interior cavity having a second SH interior cavity inner diameter, wherein the second SH interior cavity inner diameter is greater than the first SH interior cavity diameter; and wherein the distal end flange (DEF) has a DEF outer radial diameter, and the DEF outer radial diameter is less than the second SH interior cavity inner diameter, and the DEF outer radial diameter is greater than the first SH interior cavity diameter.

18. The system of claim 17, wherein the second adjustable piston (SAP) head has an SAP head outer radial surface disposed at an SAP head outer radial diameter, and the SAP head outer radial diameter is greater than the first SH interior cavity diameter.

19. The system of claim 11, wherein the spool end cap (EC) is T-shaped with a first EC portion having a first EC portion outer radial surface disposed at a first EC portion outer radial diameter, and a second EC portion extending axially outward from the first EC portion, the second EC portion having a second EC portion outer radial surface disposed at a second EC portion outer radial diameter, wherein the first EC portion outer radial diameter is greater than the second EC portion outer radial diameter.

20. A multi-adjustable valve for a flow of fluid within a lubrication system, the valve having a longitudinal axis, the valve comprising:

a biasing member;

a housing having an interior cavity, an inlet fluid port, and an outlet fluid port;

a first adjustable piston;

a second adjustable piston; and a spool;

wherein the first adjustable piston is disposed in the housing interior cavity and is positionally adjustable within the housing interior cavity and is configured to produce a pressure adjusting effect on the flow of fluid; and wherein the biasing member is axially disposed between the second adjustable piston and the spool; and wherein the second adjustable piston is disposed within the housing interior cavity and is attached to the first adjustable piston and is positionally adjustable relative to the first adjustable piston, wherein the second adjustable piston, the biasing member, and the spool are configured to produce a pressure regulating effect on the flow of fluid.

* * * * *